(12) United States Patent
Tsurumi et al.

(10) Patent No.: US 7,399,569 B2
(45) Date of Patent: Jul. 15, 2008

(54) METHOD FOR PRODUCING MICROCAPSULES, MICROCAPSULES, RECORDING MATERIAL, AND HEAT-SENSITIVE RECORDING MATERIAL

(75) Inventors: Mitsuyuki Tsurumi, Shizuoka-ken (JP); Yasuhiro Mitamura, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 11/060,539

(22) Filed: Feb. 18, 2005

(65) Prior Publication Data

US 2005/0187102 A1    Aug. 25, 2005

(30) Foreign Application Priority Data

Feb. 19, 2004    (JP)    ............................. 2004-042912
Mar. 31, 2004    (JP)    ............................. 2004-105202

(51) Int. Cl.
    *G03C 1/72*    (2006.01)
(52) U.S. Cl. ........................ 430/138; 430/157; 430/168; 264/4.7
(58) Field of Classification Search ................. 430/138, 430/168, 157; 264/4.7
    See application file for complete search history.

(56) References Cited

U.S. PATENT DOCUMENTS

| | | | |
|---|---|---|---|
| 2,800,457 A | 7/1957 | Green et al. | |
| 3,111,407 A | 11/1963 | Lindquist et al. | |
| 3,287,154 A | 11/1966 | Haas | |
| 3,418,250 A | 12/1968 | Vassiliades | |
| 3,796,669 A | 3/1974 | Kiritani et al. | |
| 3,914,511 A | 10/1975 | Vassiliades | |
| 4,001,140 A | 1/1977 | Foris et al. | |
| 4,025,455 A | 5/1977 | Shackle | |
| 4,842,978 A * | 6/1989 | Ishikawa | ..................... 430/138 |
| 5,035,975 A * | 7/1991 | Takahashi et al. | ............ 430/138 |
| 5,141,679 A * | 8/1992 | Nakamura et al. | ............ 264/4.7 |
| 5,916,680 A * | 6/1999 | Wakata et al. | ........... 428/402.21 |
| 2004/0265589 A1 * | 12/2004 | Yamada et al. | .......... 428/402.21 |

FOREIGN PATENT DOCUMENTS

| | | |
|---|---|---|
| GB | 952807 | 3/1964 |
| JP | 4-75147 A | 3/1992 |
| JP | 5-317694 A | 12/1993 |
| JP | 6-86154 A | 3/1994 |
| JP | 38-19574 B | 9/2006 |
| JP | 36-9168 B | 4/2007 |

* cited by examiner

*Primary Examiner*—John S Chu
(74) *Attorney, Agent, or Firm*—Sughrue Mion, PLLC

(57) ABSTRACT

A microcapsule produced by a method involving a primary dispersed particle and a secondary dispersed particle, the capsule formation occurring at the interface of the secondary dispersed particle. A microcapsule containing a diazonium salt represented by a specific formula. A recording material utilizing the microcapsule.

4 Claims, No Drawings

METHOD FOR PRODUCING MICROCAPSULES, MICROCAPSULES, RECORDING MATERIAL, AND HEAT-SENSITIVE RECORDING MATERIAL

CROSS-REFERENCE TO RELATED APPLICATION

This application claims priority under 35 USC 119 from Japanese patent Application Nos. 2004-042912 and 2004-105202, the disclosures of which are incorporated by reference herein.

BACKGROUND OF THE INVENTION

1. Field of the Invention

The present invention relates to a method for producing microcapsules, microcapsules obtained by the method, a recording material including the microcapsules, and a heat-sensitive recording material.

2. Description of the Related Art

Techniques of encapsulating a main active ingredient are utilized in wide areas such as heat-sensitive or pressure-sensitive recording materials, clothing fields (such as perfume capsules), medical fields (such as drug delivery systems), and food fields (such as artificial salmon roe). Such a microcapsule is generally formed in such a manner that the active ingredient diffuses to the out side of the capsule only when its separating function is lost by external action such as heating, light irradiation, pressure, pH, enzyme or hydration. Therefore, the desired function is exhibited only when such an operation is conducted.

A heat-sensitive recording material is a material which records an image by being heated with a thermal head. The heat-sensitive recording material has been popularized in a wide variety of fields because the heat-sensitive recording material is relatively inexpensive, and its recording device is simple, highly reliable, and maintenance-free. Under such circumstances, there has been an increasing demand in recent years for higher performance including high image quality and improvement in storage stability. Extensive studies have been conducted on color developing density, image quality and storage stability of the heat-sensitive recording material.

As the heat-sensitive recording material, a large number of heat-sensitive recording materials using diazonium salts as color-developing components have been developed for the purpose of fixation of recording images after thermal recording. An image is formed on the heat-sensitive recording material containing a diazonium salt by heat, and light is applied to the image so as to decompose a residual diazonium salt and to fix the image. When the diazonium salt is encapsulated, raw storage stability and color developing density can be improved significantly.

A method of forming a microcapsule is generally divided into a chemical technique, a physicochemical technique, and a physical technique. Various specific methods have conventionally been proposed. Examples of the disclosed methods include: a method utilizing coacervation of a hydrophilic wall forming material (see, for example, U.S. Pat. No. 2,800,457); an interfacial polymerization method (see, for example, U.S. Pat. No. 3,287,154, U.K. Patent No. 990443, and Japanese Patent Publication (JP-B) No. 38-19574); a method using polymer precipitation (see, for example, U.S. Pat. No. 3,418,250); a method using an isocyanate polyol wall-forming material (see, for example, U.S. Pat. No. 3,796,669); a method using an isocyanate wall-forming material (see, for example, U.S. Pat. No. 3,914,511); a method using urea-formaldehyde-based and urea-formaldehyde-resorcinol-based wall forming materials (see, for example, U.S. Pat. No. 4,001,140); a method using a polymer including polyurethane-polyurea as a main component (see, for example, JP-B No. 04-75147); a method using a mixture of xylylene diisocyanate and polymethylene polyphenyl isocyanate (see, for example, JP-B No. 06-86154); a method of using a polyvalent isocyanate previously reacted partially with monoalcohol (see, for example, Japanese Patent Application Laid-Open (JP-A) No. 5-317694); a method using wall forming materials such as melamine-formaldehyde resins, hydroxypropyl cellulose or the like, (see, for example, U.S. Pat. No. 4,025,455); an in situ method utilizing monomer polymerization (see, for example, JP-B No. 36-9168); an electrolytic dispersion cooling method (see, for example, U.K. Patent No. 952807); and a spray drying method (see, for example, U.S. Pat. No. 3,111,407).

In the interfacial polymerization method, an oil phase in which a core material is dissolved or dispersed in a hydrophobic organic solvent is poured into an aqueous phase containing a water-soluble polymer. This mixture was emulsified by using a homogenizer, followed by heating. Accordingly, a polymer forming reaction occurs at an oil-water interface. Consequently, a microcapsule wall made of a polymer substance is formed, and the core material is encapsulated. This interfacial polymerization method can provide a microcapsule whose storage stability is excellent and whose particle diameter is uniform, in a short period of time. Interfacial polymerization method having such advantages is extensively utilized.

In the in situ polymerization method, a capsule wall is formed by a polymerization film of a radical polymerizable monomer, and there are two cases: one case is a case where a polymer is deposited from the interior of a core material to form a capsule film; and the other case is a case where a polymer is deposited from the exterior of the core material to form a capsule film. As one of the characteristics of this method, a core material to be encapsulated is not limited to liquid, and solid or gas can be used in place of liquid.

In the in situ polymerization method, capsule walls are formed from polymer walls of radical-polymerizable monomers, and there is the case where the capsule film is formed by polymer deposition starting from the inside of the core substance or from the outside of the core substance, and there is an advantage that not only a liquid but also a solid or gas can be capsulated as the core substance.

In the conventional interfacial method and in situ polymerization method, however, there is a problem that when the core substance has a poor solubility in an oil phase solvent or a highly surface-active substance is contained, the emulsion polymerization reaction on the interface is easily inhibited, which results in gradual leakage of the core substance or in formation of secondary aggregates. When irregular microcapsules having such a poor inclusion ability are used in a heat-sensitive recording material, the substance in the microcapsule easily leaks out of the capsule to color the background area. Therefore, in that case, it is difficult to imagewise record an image.

In the field of a microcapsule used for a recording material, it is required to control the properties of a capsule in accordance with the target performance. Examples of the required properties of the capsule include: (1) excellent storage stability in a solution; (2) excellent long-term raw storage stability; (3) ability to suppress background fogging; (4) high transparency of material at heating; (5) stable high color development density; (6) less variation of heat sensitivity; (7) excellent light fastness or water resistance; (8) less yellowing or blemish; and (9) heat resistance or moisture resistance. For meeting these various needs, it is desirable that various wall materials can be used for forming microcapsules and the microcapsules are produced with the minimum restrictions and problems.

In the conventional methods, however, when a wall material is added to an oil phase which is to become a core substance, a necessary amount of the desired wall material cannot be added in some cases because of a change in solubility or deterioration in compatibility. Consequently, in such cases, the reaction of forming the capsule wall does not proceed, an the core substance cannot be sufficiently covered with the capsule wall. Particularly when a heterocyclic diazonium salt having an improved heat stability and a higher ability to donate an electron to a diazonio group is used, the solubility of the diazonium is in the oil phase is decreased owing to $\pi$ electron-$\pi$ electron stacking, compared to conventional aryl diazonium salts. This poor solubility causes a serious problem of a reduction in the degree of whiteness in the background area.

When the core substance and capsule wall material easily react with each other, they react with each other at mixing to cause fogging and coloring. Since heat is generated upon contact with water or high-speed stirring at emulsification, in some cases, the reaction proceeds partially to inhibit sufficient emulsification. There are also problems that after the capsule-forming reaction is completed, unreacted wall material remains in the core substance, and that the size of the capsule particle cannot be sufficiently reduced.

Because of the problems such as a limited range of selection of microcapsule wall materials for desired performance and lack of production suitability as described above, there are considerable restrictions on the wall material which can be actually formed into microcapsules. Therefore, there is a strong demand for a method for producing microcapsules having an arbitrary capsule characteristics.

Particularly when microcapsules are used in heat-sensitive recording materials and the like, there are various restrictions. There are problems such as a limited range of selection of microcapsule materials if the recording material has to have characteristics such as high sensitivity, excellent raw storage stability and background whiteness, and such microcapsules are not suitable for production. Therefore, there is strong demand for development of a new method for producing microcapsules by which microcapsules suitable for heat-sensitive recording materials and the like can be widely and freely designed. There are also demands for development of a microcapsule obtained by the method and a heat-sensitive recording material including the microcapsule.

SUMMARY OF THE INVENTION

In consideration of the problem described above, the inventors has made extensive study and reached the invention. According to the invention, a method for producing microcapsule, a microcapsule, and a heat-sensitive recording material as described below are provided.

The invention provides a method for producing a microcapsule containing a core substance, the method comprising:

adding an oil phase solution including a core substance to an aqueous phase medium to form a first mixture;

forming a first emulsion including a primary dispersed particle by emulsifying the first mixture;

adding a wall material solution including a capsule wall material to the first emulsion so as to form a second mixture;

forming a secondary dispersed particle by emulsifying the second mixture; and forming a capsule wall at an interface of the secondary dispersed particle.

The invention also provides a method for producing a microcapsule containing a core substance, the method comprising:

adding a wall material solution including a capsule wall material to an aqueous phase medium to form a first mixture;

forming a first emulsion including a primary dispersed particle by emulsifying the first mixture;

adding an oil phase solution including a core substance to the first emulsion so as to form a second mixture;

forming a secondary dispersed particle by emulsifying the second mixture; and forming a capsule wall at an interface of the secondary dispersed particle.

The invention further provides a method for producing a microcapsule containing a core substance, the method comprising:

adding an oil phase solution including a core substance to a first aqueous phase medium to form a first mixture;

forming a first emulsion including a first primary dispersed particle by emulsifying the first mixture;

adding a wall material solution including a capsule wall material to a second aqueous phase medium to form a second mixture;

forming a second emulsion including a second primary dispersed particle by emulsifying the second mixture;

mixing the first emulsion and the second emulsion to form a third mixture;

forming a secondary dispersed particle by emulsifying the third mixture; and forming a capsule wall at an interface of the secondary dispersed particle.

The invention further provides microcapsules produced by the above methods.

The invention further provides heat-sensitive recording materials each comprising a support and a heat-sensitive recording layer including any of the above microcapsules, wherein the heat-sensitive recording layer is disposed on the support.

The above microcapsules may contain diazonium salts each represented by the following formula (I) or (II):

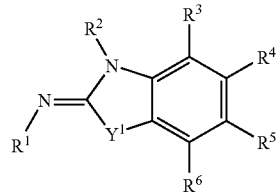

Formula (I)

wherein in the formula (I): $R^1$ and $R^2$ each independently represent an alkyl group, an alkoxy group, an alkylthio group, an arylthio group or an alkylamino group; $R^3$ to $R^6$ each independently represent a hydrogen atom, a halogen atom, an alkyl group, an alkoxy group, an aryl group, an aryloxy group, an alkylthio group, an arylthio group, an alkylamino group or a —$N_2^+X^-$ group; at least one of $R^3$ to $R^6$ represents a —$N^{2+}X^-$ group; $X^-$ represents a monovalent counter anion; and $Y^1$ represents a sulfur atom, an oxygen atom, or a nitrogen atom bound to an alkyl group,

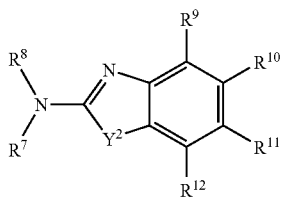

Formula (II)

wherein in the formula (II): $R^7$ and $R^8$ each independently represent a hydrogen atom, an alkyl group, an alkoxy group, an aryl group, an alkylthio group, an arylthio group or an alkylamino group; $R^7$ and $R^8$ may be bound to each other to form a nitrogen-containing ring; $R^9$ to $R^{12}$ each independently represent a hydrogen atom, a halogen atom, an alkyl group, an alkoxy group, an aryl group, an aryloxy group, an alkylthio group, an alkylamino group or a —$N_2^+X^-$ group; at least one of $R^9$ to $R^{12}$ represents a —$N_2^+X^-$ group; $X^-$ represents a monovalent counter anion; and $Y^2$ represents a sulfur atom, an oxygen atom, or a nitrogen atom bound to an alkyl group.

The invention further provides microcapsules produced by the above methods.

The invention further provides microcapsule liquids including the above microcapsules.

The invention further provides recording materials comprising the above microcapsules.

The invention further provides a heat-sensitive recording material comprising a support and a heat-sensitive recording layer including a diazonium salt and a coupler compound capable of forming an azo colorant by a coupling reaction with the diazonium salt, wherein the heat-sensitive recording layer was coated on or over the support by using a coating liquid, and the coating liquid included the any of the above microcapsules.

DETAILED DESCRIPTION OF THE INTENTION

Hereinafter, the present invention is described in detail. However, the invention is not limited to the following embodiments and examples.

(Method for Producing Microcapsules)

The method (R1) of the invention for producing a microcapsule including a core substance comprises adding an oil-phase solution including a core substance to an aqueous phase medium, emulsifying the mixture liquid to form a primary dispersed particle, adding a wall material solution including a capsule wall material to the mixture liquid, emulsifying the mixture liquid to form a secondary dispersed particle, and forming a capsule wall at the interface of the secondary dispersed particle.

The method (R2) of the invention for producing a microcapsule including a core substance comprises adding a wall material solution including a capsule wall material to an aqueous phase medium, emulsifying the mixture liquid to form a primary dispersed particle, adding a oil phase solution including a core substance to the mixture liquid, emulsifying the mixture liquid to form a secondary dispersed particle, and forming a capsule wall at the interface of the secondary dispersed particle.

The method (R3) of the invention for producing a microcapsule including a core substance comprises adding an oil phase solution including a core substance to an aqueous phase medium to form a first mixture liquid, emulsifying the first mixture liquid to form a first primary dispersed particle, adding a wall material solution including a capsule wall material to an aqueous phase medium to form a second mixture liquid, emulsifying the second mixture liquid to form a second primary dispersed particle, mixing and emulsifying the first mixture liquid and the second mixture liquid to form a secondary dispersed particle, and forming a capsule wall at the interface of the secondary dispersed particle.

In these methods of producing microcapsules, it is not necessary to dissolve the wall material solution including a capsule wall material in the oil phase solution including a core substance. Accordingly, any capsule wall material can be used without restriction imposed by the solubility of the capsule wall material in the oil phase solution. The amount of the capsule wall material added to the oil phase solution is not limited, and thus the wall material solution including a capsule wall material may be added in a sufficient amount for the desired capsule performance. The solvent in the oil phase solution including a core substance may be selected without considering the compatibility of the solvent with the capsule wall material, and a suitable solvent may be used in a required amount in accordance with the purpose.

That is, the method for producing a microcapsule is a useful method having the following advantages which cannot be achieved in the conventional methods: (1) a capsule wall material having a poor compatibility with the oil phase including the core substance can be used, (2) a capsule wall material reacting with the oil phase including a core substance can be used, (3) a wall material solution including a sufficient amount of capsule wall material can be added, (4) generation of heat can be minimized at emulsification with a high-speed stirring apparatuses or the like, so that microcapsules having very small particle sizes and narrow particle size distribution can be prepared, and (5) the wall material remaining in the core can be minimized, so that the wall material is most effectively used for the inclusion of the core.

The term "an interface of the secondary dispersed particle" used herein refers to an oil-water interface on the surface of the secondary dispersed particle. In other words, "an interface of the secondary dispersed particle" refers to an interface between the secondary dispersed particle and the aqueous phase medium.

The method (R4) of the invention for producing a microcapsule comprises adding a solution including a capsule wall material to an aqueous phase medium, emulsifying the mixture liquid to form a primary dispersed particle, adding an oil phase solution including a diazonium salt represented by the formula (I) or (II) to the mixture liquid, emulsifying the mixture liquid to form a secondary dispersed particle, and forming a capsule wall at the interface of the secondary dispersed particle.

The method (R5) of the invention for producing a microcapsule comprises adding an oil phase solution including a diazonium salt represented by the formula (I) or (II) to a first aqueous phase medium to form a first mixture liquid, emulsifying the first mixture liquid to form a first primary dispersed particle, adding a solution including a capsule wall material to a second aqueous phase medium to form a second mixture liquid, emulsifying the second mixture liquid to form a second primary dispersed particle, mixing and dispersing the first mixture liquid and the second mixture liquid to form a secondary dispersed particle, and forming a capsule wall at the interface of the secondary dispersed particle.

In these methods of producing microcapsules, it is not necessary to dissolve the wall material solution including a capsule wall material in the oil phase solution including a core substance such as a diazonium salt. Accordingly, any capsule wall material can be used without restriction imposed by the solubility of the capsule wall material in the oil phase solution and can be selected in accordance with the purpose (such as an improvement in raw storage stability and inhibition of background fogging). The amount of the capsule wall material added to the oil phase solution is not limited, and thus the wall material solution including a capsule wall material may be added in a sufficient amount for the desired capsule performance. The solvent in the oil phase solution including a core substance may be selected without considering the compatibility of the solvent with the capsule wall material, and a suitable solvent may be used in a required amount in accordance with the purpose.

That is, the method for producing a microcapsule is a useful method having the following advantages which cannot be achieved in the conventional methods: (1) a capsule wall material having a poor compatibility with the oil phase including the core substance can be used, (2) a capsule wall material reacting with the oil phase including a core substance can be used, (3) a wall material solution including a sufficient amount of capsule wall material can be added, (4) generation of heat can be minimized at emulsification with a high-speed stirring apparatuses or the like, so that microcapsules having very small particle sizes and narrow particle size distribution can be prepared, and (5) the wall material remaining in the core can be minimized, so that the wall material is most effectively used for the inclusion of the core and that the microcapsule is suitable for use in heat-sensitive recording materials.

Hereinafter, the method of the invention for producing a microcapsule, the microcapsule, the diazonium salt used in the invention, the heat-sensitive recording material, and the like are described in detail. However, the invention is not limited to the following embodiments and examples.

The kind and characters of wall material used in the invention are not particularly limited and can be suitably selected in accordance with the purpose and necessity. From the viewpoint of rapidly forming a strong film with a fine mesh, the wall material is preferably a reactant capable of forming a polymer material by interfacial polymerization. The polymer material may be, for example, a polyurethane resin, a polyurea resin, a polyamide resin, a polyester resin, a polycarbonate resin, an aminoaldehyde resin, a melamine resin, a polystyrene resin, a styrene-acrylate copolymer resin, a styrene-methacrylate copolymer resin, a gelatin, a polyvinyl alcohol, or an arbitrary copolymer thereof. A polyurethane resin, a polyurea resin, a polyamide resin, a polyester resin and a polycarbonate resin are preferable from the viewpoint of capsule formability and capsule characteristics. A polyurethane-polyurea mixed resin is particularly preferable.

In the invention, when the polyurethane-polyurea mixed resin is used as the capsule wall material, the microcapsule can be obtained by: adding a polyvalent isocyanate capsule wall precursor such as diisocyanate, triisocyanate, tetraisocyanate or polyisocyanate prepolymer to an aqueous phase medium or an emulsification medium; emulsifying the mixture liquid to form a dispersed particle; adding a second material (for example, a prepolymer having two or more amino groups, piperazine or a derivative thereof, a polyol, and a polyamine such as a diamine, a triamine or a tetramine) capable of reacting with the microcapsule wall precursor to form a polymer material (capsule walls) to the mixture liquid; and cause a polymerization reaction usually by heat at the interface of the oil droplet to form a microcapsule wall.

A microcapsule having a polyurea-polyamide or polyurethane-polyamide composite wall can be formed by: adding a polyvalent isocyanate and a second material (for example, an acid chloride, a polyamine, a polyol or the like) capable of reacting with the polyvalent isocyanate to an aqueous phase medium or an emulsification medium so as to form a capsule wall; emulsifying the mixture liquid to form a dispersed particle; and causing a reaction usually by heat to form the capsule wall. The method of producing the polyurea-polyamide composite wall is described in detail in JP-A 58-66948, the disclosure of which is incorporated herein by reference.

The isocyanate compound used as the capsule wall material is preferably a compound having a tri- or higher valent isocyanate group, and may be used in combination with a divalent isocyanate compound.

Examples of such an isocyanate compound include: dimers or trimers (burette or isocyanurate) of diisocyanates such as xylylene diisocyanate and hydrogenated products thereof, hexamethylene diisocyanate, tolylene diisocyanate and hydrogenated products thereof, and isophorone diisocyanate; polyol (e.g. trimethylol propane)-bifunctional isocyanate (e.g. xylylene diisocyanate) adducts which are multifunctional; compounds obtained by introducing polymer compounds such as polyethers (e.g. polyethylene oxide) having active hydrogens into polyol (e.g. trimethylol propane)-bifunctional isocyanate (e.g. xylylene diisocyanate) adducts; and formalin condensates of benzene isocyanate.

Compounds described in JP-A Nos. 62-212190, 4-26189, 5-317694 and 10-114153 can also be used. The disclosures of the above four documents are incorporated herein by reference.

Examples of the polyvalent isocyanate compound used in the invention include: diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-diphenylmethane-4,4'-diisocyanate, xylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate and cyclohexylene-1,4-diisocyanate; triisocyanates such as 4,4',4''-triphenylmethane triisocyanate and toluene-2,4,6-triisocyanate; tetraisocyanates such as 4,4'-dimethylphenylmethane-2,2',5,5'-tetraisocyanate; and isocyanate prepolymers such as hexamethylene diisocyanate-trimethylol propane adducts, 2,4-tolylene diisocyanate-trimethylol propane adducts, xylylene diisocyanate-trimethylol propane adducts, and tolylene diisocyanate-hexane triol adducts. Two or more polyvalent isocyanates may be used in accordance with the necessity. A polyvalent isocyanate compound including three or more isocyanate groups is preferable.

Specific examples of the polyol and polyamine which can be added as another component of the wall material to the aqueous phase or oil phase include propylene glycol, glycerin, trimethylol propane, triethanol amine, sorbitol, and hexamethylene diamine. When a polyol is added, a polyurethane wall is formed. In an embodiment, the reaction temperature is maintained high in the wall-formation reaction in order to increase the reaction rate. In another embodiment, a suitable polymerization catalyst is added in the wall-formation reaction in order to increase the reaction rate.

The polyisocyanate, polyol, reaction catalyst, and polyamine as a component of the wall material are described in detail in "Polyurethane Handbook" edited by Keiji Iwata (The Nikkan Kogyo Shimbun Ltd., 1987), the disclosure of which is incorporated herein by reference.

In an embodiment, the capsule wall is formed by the above isocyanate reaction (nucleophilic-electrophilic reaction system). In another embodiment, the capsule wall is formed by a polymerization of a monomer having an ethylenically unsaturated double bond. Any monomer having an ethylenically unsaturated bond or any combination of monomers having ethylenically unsaturated bonds may be used as long as the effect of the invention is obtained.

Examples of the monomer include: acrylic acid and its salts; acrylic esters; acrylic amides; methacrylic acid and its salts; methacrylic esters; methacrylic amides; maleic acid; maleic anhydride; maleic esters; maleic amides; itaconic acid; itaconic esters; itaconic amides; styrene and substituted styrene derivatives; vinyl ethers; vinyl esters; N-vinyl heterocycles; allyl ethers; allyl esters; N-allyl heterocycles; isopropenyl ethers; isopropenyl esters; and N-isopropenyl heterocycles.

An acrylic ester, a methacrylic ester, an acryl amide, a methacryl amide, a vinyl ether, a vinyl ester, and a styrene each of which has 20 or less carbon atoms are preferable since they are easily available and can efficiently form a strong capsule wall having fine mesh.

From the viewpoint of efficient formation of a strong capsule wall having fine mesh, the monomer having an ethylenically unsaturated double bond used in the invention is preferably a multifunctional monomer having at least two ethylenically unsaturated double bonds.

Examples of the multifunctional monomer include: esters between polyvalent alcohols (such as trimethylol propane and pentaerythritol) and unsaturated carboxylic acids (such as acrylic acid, methacrylic acid, itaconic acid, crotonic acid, isocrotonic acid, and maleic acid); acrylic esters and methacrylic esters of polyvalent phenols such as resorcinol, pyrogallol and phloroglucinol; acrylic esters and methacrylic esters of bisphenols; amide compounds between unsaturated carboxylic acids and aliphatic multivalent amine compounds; epoxys having terminal acrylates; epoxys having terminal methacrylates; polyesters having terminal acylates; and polyesters having terminal methacrylates.

The multifunctional monomer is preferably ethylene glycol diacrylate, ethylene glycol dimethacrylate, trimethylol propane triacrylate, pentaerythritol tetraacrylate, dipentaerythritol hydroxy pentaacrylate, hexanediol-1,6-dimethacrylate, or diethylene glycol dimethacrylate since they are easily available and capable of efficiently forming a strong capsule wall having fine mesh.

The content of the multifunctional monomer having two or more ethylenically unsaturated double bonds in all the monomers having ethylenically unsaturated double bonds is preferably 0.1 to 90 mol %, more preferably 0.5 to 80 mol %, still more preferably 1.0 to 70 mol %, from the viewpoint of further improving the strength of the capsule wall, the fineness of the mesh of the capsule wall, and the efficiency of forming the capsule wall.

In an embodiment, the microcapsule wall material is added such that the average particle diameter of the microcapsules is 0.05 to 20 μm and the thickness of the microcapsule wall is 0.005 to 0.3 μm. The size of the dispersed particles is generally about 0.1 to 15 μm.

From the viewpoint of securing a predetermined strength and fineness of the mesh of the capsule wall, the amount of the wall material to be added is preferably 5 to 95%, more preferably 10 to 90%, still more preferably 15 to 70%, further preferably 20 to 60%, based on the mass of the oil phase including the core material. When the amount is smaller than 5%, the strength of the wall and the fineness of the mesh of the wall are likely to be insufficient. On the other hand, when the amount is larger than 90%, heat sensitivity is unlikely to be satisfactory and the encapsulating quality is likely to be deteriorated.

The wall material solution includes the capsule wall material and an organic solvent which dissolves the capsule wall material. When the capsule wall material itself is an oil component, the organic solvent may be omitted. The organic solvent may be, for example, a low-boiling co-solvent such as an acetic ester, methylene chloride, cyclohexanone, tetrahydrofuran or acetonitrile.

The microcapsule of the invention encapsulates at least a core substance. The core substance may be, for example, coloration component (a) or coloration component (b). The substances whose examples are shown below may be further included in the core in accordance with the purpose and necessity: a high-boiling organic solvent as an oil component, a low-boiling organic solvent as a co-solvent, a hydrophobic polymer, a plasticizer, various additives, and fillers.

A solvent, particularly an organic solvent, can be used in the oil phase solution forming the core substance in the invention. Examples of the organic solvent include: low-boiling co-solvents such as acetic esters, methylene chloride and cyclohexanone; and high-boiling organic solvents such as phosphoric esters, phthalic esters, acrylic esters, methacrylic esters, other carboxylic esters, fatty acid amides, alkylated biphenyl, alkylated terphenyl, alkylated naphthalene, diaryl ethane, chlorinated paraffin, alcohol solvents, phenol solvents, ether solvents, monolefin solvents and epoxy solvents.

Specific examples of the high-boiling organic solvents include tricresyl phosphate, trioctyl phosphate, octyldiphenyl phosphate, tricyclohexyl phosphate, dibutyl phthalate, dioctyl phthalate, dilaurate phthalate, dicyclohexyl phthalate, butyl olefinate, diethylene glycol benzoate, dioctyl sebacate, dibutyl sebacate, dioctyl adipate, trioctyl trimellitate, acetyltriethyl citrate, octyl maleate, dibutyl maleate, isoamyl biphenyl, chlorinated paraffin, diisopropyl naphthalene, 1,1'-ditolyl ethane, monoisopropyl biphenyl, diisopropyl biphenyl, 2,4-di-tert-amyl phenol, N,N-dibutyl-2-butoxy-5-tert-octyl aniline, 2-ethylhexyl hydroxybenzoate and polyethylene glycol. Alcohol solvents, phosphoric ester solvents, carboxylic ester solvents, alkylated biphenyl, alkylated terphenyl, alkylated naphthalene and diaryl ethane are particularly preferable. In an embodiment, the high-boiling solvent is a solvent having an unsaturated fatty acid such as a α-methyl styrene dimer.

In the invention, a water-soluble polymer is preferably included in the aqueous phase medium. Examples thereof include polyvinyl alcohol, silanol-modified polyvinyl alcohol, carboxy-modified polyvinyl alcohol, amino-modified polyvinyl alcohol, itaconic acid-modified polyvinyl alcohol, a styrene-maleic anhydride copolymer, a butadiene-maleic anhydride copolymer, an ethylene-maleic anhydride copolymer, an isobutylene-maleic anhydride copolymer, polyacrylamide, polystyrene sulfonic acid, polyvinyl pyrrolidone, an ethylene-acrylic acid copolymer, and gelatin. Carboxy-modified polyvinyl alcohol is preferable.

An emulsion or latex of a hydrophobic polymer can be used in combination with the water-soluble polymer. The emulsion or latex may be, for example, a styrene-butadiene copolymer, a carboxy-modified styrene-butadiene copolymer, or an acrylonitrile-butadiene copolymer. If necessary, a conventional surfactant may be added thereto.

The method (R1) for producing a microcapsule comprises adding an oil-phase solution including a core substance to an aqueous phase medium, emulsifying the mixture liquid to form a primary dispersed particle, adding a wall material solution including a capsule wall material to the mixture liquid to form a secondary dispersed particle, emulsifying the mixture liquid to form a secondary dispersed particle, and forming a capsule wall at the interface of the secondary dispersed particle.

In the method (R1), the mixing ratio by mass of (the oil phase solution/aqueous phase solution) at the first emulsification is preferably 5/95 to 90/10, more preferably 10/90 to 70/30, most preferably 15/85 to 60/40, in order to conduct the emulsification stably. When the ratio is lower than 5%, the desired diameter of the dispersed particles may not be obtained, while when the ratio is higher than 90%, emulsification is likely to be difficult, formation of capsules is likely to be difficult and capsules are likely to aggregate easily.

In the method (R1), the emulsification temperature at the first emulsification may be arbitrarily selected within the temperature range of 0° C. to 100° C., in which the aqueous phase is in the form of a liquid. On one hand, the emulsification temperature at the second emulsification is preferably in the range of 0° C. to 50° C., more preferably 0° C. to 45° C., most preferably 10° C. to 45° C., considering the addition of the capsule wall material. When the emulsification temperature is lower than 0° C., the aqueous phase may be solidified. When the emulsification temperature is higher than 50° C., the capsulation reaction may be initiated at the emulsification to cause aggregation.

The method (R2) comprises adding a wall material solution including a capsule wall material to an aqueous phase medium, emulsifying the mixture liquid to form a primary dispersed particle, adding a oil phase solution including a core substance to the mixture liquid, emulsifying the mixture liquid to form a secondary dispersed particle, and forming a capsule wall at the interface of the secondary dispersed particle.

In the method (R2), the mixing ratio by mass of (the wall material solution/aqueous phase solution) at the first emulsification is preferably 5/95 to 90/10, more preferably 5/95 to 70/30, most preferably 5/95 to 60/40, in order to conduct the emulsification stably. When the ratio is lower than 5%, the desired diameter of the dispersed particles may not be obtained, while when the ratio is higher than 90%, emulsification is likely to be difficult, formation of capsules is likely to be difficult and capsules are likely to aggregate easily.

In the method of forming the microcapsules, the emulsification temperatures at the first and second emulsifications are preferably in the range of 0° C. to 50° C., more preferably 0° C. to 45° C., most preferably 10° C. to 45° C. When the emulsification temperature is lower than 0° C., the aqueous phase may be solidified. When the emulsification temperature is higher than 50° C., the capsulation reaction may be initiated at the emulsification to cause aggregation.

The method (R3) comprises adding an oil phase solution including a core substance to a first aqueous phase medium to form a first mixture liquid, emulsifying the first mixture liquid to form a first primary dispersed particle, adding a wall material solution including a capsule wall material to a second aqueous phase medium to form a second mixture liquid, emulsifying the second mixture liquid to form a second primary dispersed particle, mixing and emulsifying the first mixture liquid and the second mixture liquid to form a secondary dispersed particle, and forming a capsule wall at the interface of the secondary dispersed particle.

In the method (R3), the mixing ratio by mass of (the oil phase solution/aqueous phase solution) in the first mixture liquid is preferably 5/95 to 90/10, more preferably 10/90 to 70/30, most preferably 15/85 to 60/40, in order to conduct the emulsification stably. When the ratio is lower than 5%, the desired diameter of the dispersed particles may not be obtained, while when the ratio is higher than 90%, emulsification is likely to be difficult, formation of capsules is likely to be difficult and capsules are likely to aggregate easily.

In the method (R3), the emulsification temperature at the first emulsification may be selected arbitrarily within the temperature range of 0° C. to 100° C., in which the aqueous phase is in the form of a liquid. The mixing ratio by mass of (the wall material solution/aqueous phase solution) in the second mixture liquid is preferably 5/95 to 90/10, more preferably 5/95 to 70/30, most preferably 5/95 to 60/40. When the ratio is lower than 5%, the desired diameter of the dispersed particles may not be obtained. When the ratio is higher than 90%, emulsification is likely to be difficult, formation of capsules is likely to be difficult and capsules are likely to aggregate easily.

The emulsification temperatures at the second and third emulsifications are preferably in the range of 0° C. to 50° C., more preferably 0° C. to 45° C., most preferably 10° C. to 45° C. When the emulsification temperatures are lower than 0° C., the aqueous phase may be solidified. When the emulsification temperatures are higher than 50° C., the capsulation reaction may be initiated at the emulsification to cause aggregation.

In an embodiment, every emulsification can be conducted easily by a known emulsification apparatus. Examples of the known apparatus include a homogenizer, manton gaulin, ultrasonic disperser, a dissolver, or Keddy mill. The emulsifier and emulsification conditions in each step may be the same of different. In the method (R3), any two of the three emulsification processes may have the same emulsification conditions and/or may use the same emulsifier.

After the secondary dispersed particle is emulsified, the secondary dispersed particle is used for the capsule formation. In the capsule formation, the emulsion including the secondary dispersed particle is heated to a temperature of 25 to 80° C., preferably 30 to 70° C., for the purpose of promoting the capsule forming reaction. In an embodiment, in the capsule forming reaction, water is added to reduce the probability of collision of the capsules or the emulsion is sufficiently stirred, in order to prevent the aggregation of capsules. In the capsule formation, an additional dispersion for preventing aggregation may be added to the emulsion.

When the polyvalent isocyanate compound or the like is used, generation of carbon dioxide gas is observed as the polymerization reaction proceeds, and the cessation of the gas generation can be regarded as the end point of the polymerization reaction. When carbon dioxide gas is not generated, the disappearance or cessation of consumption of the monomer component or capsule wall precursor may be regarded as the indicator of the completion of the reaction.

However, in practice, the reaction does not have to proceed to 100% completion, and the reaction can be ceased when the reaction have proceeded to practically sufficient degree. Usually, the reaction is conducted for dozens of minutes to several hours during which the reaction proceeds to the practically sufficient degree to form the desired microcapsule.

(Coloring Component and Heat-sensitive Recording Material)

The microcapsules produced by the above methods are preferably applied, for example to heat-sensitive recording materials. In an embodiment, a heat-sensitive layer is provided on a support, and the heat-sensitive layer includes a microcapsule including a coloring component as a core material or a component capable of reacting with a coloring component to develop color. The heat-sensitive recording material in the embodiment can have a high-quality, excellent raw storage stability before printing, excellent color developing sensitivity (γ), and suppressed yellowing (staining) in the background.

The color-forming component system used in the invention is preferably a combination of a substantially colorless color-forming component (a) and a substantially colorless color-forming component (b) that is capable of reacting with the component (a) to form color. This combination is a so-called two-component color-forming component system. Further, in order to enhance storage stability while suppressing background fogging, one of the color-forming component (a) and the color-forming component (b) is encapsulated in the microcapsule of the invention.

Examples of combinations used in such a two-component color-forming system include the following combinations (1) to (18). In the following list, the former substance represents the color-forming components (a) and the latter substance represents the color-forming components (b) which is capable of reacting with the color-forming components (a) to form color:

(1) a combination of an electron donating dye precursor and an electron accepting compound;

(2) a combination of a diazonium salt compound and a coupling component (hereinafter, occasionally referred to as a "coupler compound");

(3) a combination of a metal salt of an organic acid such as silver behenate or silver stearate and a reducing agent such as protocatechinic acid, spiroindane or hydroquinone;

(4) a combination of an iron salt of a long-chain aliphatic acid such as ferric stearate or ferric myristate and a phenol such as tannic acid, gallic acid or ammonium salicylate;

(5) a combination of a heavy metal salt of an organic acid and a sulfide of an alkali metal or alkaline earth metal, or a combination of a heavy metal salt of an organic acid and an organic chelating agent, wherein examples of the heavy metal include nickel, cobalt, lead, copper, iron, mercury, and silver, examples of the organic acid include acetic acid, stearic acid, and palmitic acid, examples of the sulfide of an alkali metal or alkaline earth metal include calcium sulfide, strontium sulfide, and potassium sulfide, and examples of the organic chelating agent include s-diphenyl carbazide and diphenylcarbazone;

(6) a combination of a heavy metal salt of sulfuric acid such as a sulfate of silver, lead, mercury or sodium, and a sulfur compound such as sodium tetrathionate, sodium thiosulfate, or thiourea;

(7) a combination of a ferric salt of a fatty acid such as ferric stearate and an aromatic polyhydroxy compound such as 3,4-hydroxytetraphenylmethane;

(8) a combination of a metal salt of an organic acid such as silver oxalate or mercury oxalate and an organic polyhydroxy compound such as polyhydroxy alcohol, glycerin, or glycol;

(9) a combination of a ferric salt of a fatty acid such as ferric pelargonate or ferric laurate and thiocetylcarbamide or an isothiocetylcabamide derivative;

(10) a combination of a lead salt of an organic acid such as lead caproate, lead pelargonate or lead behenate and a thiourea derivative such as ethylene thiourea or N-dodecyl thiourea;

(11) a combination of a heavy metal salt of a higher fatty acid such as ferric stearate or copper stearate and zinc dialkyldithiocarbamate;

(12) a combination which forms an oxazine dye such as a combination of resorcin and a nitroso compound;

(13) a combination of a formazan compound and a reducing agent, a combination of a formazan compound and a metal salt, or a combination of a formazan compound, a reducing agent, and a metal salt;

(14) a combination of a protected dye (or leuco dye) precursor and a deprotecting agent;

(15) a combination of an oxydization-type coloring agent and an oxidizing agent;

(16) a combination of a phthalonitrile and a diiminoisoindoline (combination which produces phthalocyanine);

(17) a combination of an isocyanate and a diiminoisoindoline (combination which produces a coloring pigment); and

(18) a combination of a pigment precursor and an acid or a base (combination which forms a pigment).

Among the above combinations, combinations (1) and (2) are preferable, which are respectively a combination of an electron donating dye precursor and an electron accepting compound and a combination of a diazonium salt compound and a coupling component. The color-forming component (a) contained in the microcapsule is preferably the electron donating dye precursor in the combination (1) or the diazonium salt compound in the combination (2).

Hereinafter, the color-forming component system (1) and (2) is explained in more detail.

(1) Combination of an Electron Donating Dye Precursor and an Electron Accepting Compound The electron donating dye precursor used for the invention is a substantially colorless compound which is capable of donating electrons or accepting protons from acid to form color. In a preferable embodiment, the electron donating dye precursor includes a partial structure such as lactone, lactam, sulton, spiropyran, ester or amide, and the partial structure undergoes a rapid ring-opening reaction or a rapid cleavage reaction when the electron donating dye precursor contacts an electron accepting compound.

Examples of the electron donating dye precursor include: a triphenylmethane phthalide compound, a fluoran compound, a phenothiazine compound, an indolyl phthalide compound, a leucoauramine compound, a rhodamine lactam compound, a triphenylmethane compound, a triazene compound, a spiropyran compound, a fluorene compound, a pyridine compound, and a pyrazine compound.

The phthalide compound may be, for example, a compound selected from the phthalide compounds described in U.S. Reissue Pat. No. 23,024, U.S. Pat. No. 3,491,111, U.S. Pat. No. 3,491,112, U.S. Pat. No. 3,491,116 and U.S. Pat. No. 3,509,174, the disclosures of which are incorporated by reference herein. Specific examples of the phthalide compound include: 3,3-bis(p-dimethylaminophenyl)-6-dimethylaminophthalide, 3,3-bis(p-diethylamino-o-butoxyphenyl)-4-azaphthalide, and 3-(p-diethylamino-o-butoxyphenyl)-3-(1-pentyl-2-methylindol-3-yl)-4-azaphthalide, and 3-(p-dipropylamino-o-methylphenyl)-3-(1-octyl-2-methylindol-3-yl)-5-aza (or -6-aza, or -7-aza)phthalide.

The fluorane compound may be a compound selected from the fluorane compounds described in U.S. Pat. No. 3,624,107, U.S. Pat. No. 3,627,787, U.S. Pat. No. 3,641,011, U.S. Pat. No. 3,462,828, U.S. Pat. No. 3,681,390, U.S. Pat. No. 3,920,510 and U.S. Pat. No. 3,959,571, the disclosures of which are incorporated by reference herein. Specific examples of the fluorane compound include 2-(dibenzylamino)fluorane, 2-anilino-3-methyl-6-diethylaminofluorane, 2-anilino-3-methyl-6-dibutylaminofluorane, 2-anilino-3-methyl-6-N-ethyl-N-isoamylaminofluorane, 2-anilino-3-methyl-6N-methyl-N-cyclohexylaminofluorane, 2-anilino-3-chloro-6-diethylaminofluorane, 2-anilino-3-methyl-6-N-ethyl-N-isobutylaminofluorane, 2-anilino-6-dibutylaminofluorane, 2-anilino-3-methyl-6-N-ethyl-N-tetrahydrofurfurylaminofluorane, 2-anilino-3-methyl-6-piperidinoaminofluorane, 2-(o-chloroanilino)-6-diethylaminofluorane, and 2-(3,4-dichlolanilino)-6-diethylaminofluorane.

The phenothiazine compound may be, for example, benzoyl leucomethylene blue or p-nitrobenzyl leucomethylene blue. The leucoauramine compound may be, for example, 4,4'-bis-dimethylaminobenzhydrine benzyl ether, N-halophenyl-leucoauramine, or N-2,4,5-trichlorophenyl leucoauramine. The rhodamine lactam compound may be, for example, rhodamine-B-anilinolactam or rhodamine-(p-nitrino)lactam. The spiropyran compound may be a compound described in U.S. Pat. No. 3,971,808, the disclosure of which is incorporated by reference herein. Specific examples of the spiropyran compound include 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methyoxy-benzo)spiropyran, and 3-propyl-spiro-dibenzopyran. The pyridine compound or the pyrazine compound may be selected from the compounds described in U.S. Pat. Nos. 3,775,424, 3,853,869 and 4,246,318, the disclosures of which are incorporated by reference herein. The fluorene compound may be selected from the compounds described in Japanese Patent Application Laid-Open (JP-A) No. 63-094878, the disclosure of which is incorporated by reference herein.

If the microcapsule is used in a color heat-sensitive recording material, at least one electron donating dye precursor which is colorless and each of which can develop cyan, magenta, or yellow is used. The precursors for cyan, magenta and yellow may be selected from the precursors disclosed in U.S. Pat. No. 4,800,149, the disclosure of which is incorporated by reference herein. The precursor for yellow may be selected also from the precursors described in U.S. Pat. No. 4,800,148 (the disclosure of which is incorporated by reference herein), and the precursor for cyan may be selected also from the precursors described in JP-A No. 63-53542, the disclosure of which is incorporated by reference herein.

The content of the electron donating dye precursor in the heat-sensitive recording layer of the invention is preferably 0.01 to 3 g/m$^2$, and more preferably 0.1 to 1 g/m$^2$. When the content of the precursor is within the range, sufficient color optical density can be obtained without degradation of coatability. When the heat-sensitive material comprise a multi-layered structure consisting of a plurality of recording layers, the multi-layered structure is preferably a lamination of a plurality of recording layers each having a content of the precursor in the above range.

Examples of the electron accepting compound usable in the invention include: 3-halo-4-hydroxybenzoic acid described in JP-A No. 4-226455 (the disclosure of which is incorporated by reference herein), methacryloxyethyl esters and acryloxyethyl esters of benzoic acid having a hydroxyl group described in JP-A No. 63-173682 (the disclosure of which is incorporated by reference herein), esters of hydroxymethylstyrene with benzoic acid having a hydroxyl group described in JP-A Nos. 59-83693, 60-141587 and 62-99190 (the disclosures of which are incorporated by reference herein), hydroxystyrene described in European Patent No. 29323, N-vinylimidazole complexes of zinc halogenide described in JP-A Nos. 62-167077 and 62-16708 (the disclosures of which are incorporated by reference herein), and electron accepting compounds described in JP-A No. 63-317558 (the disclosure of which is incorporated by reference herein). Among these, 3-halo-4-hydroxybenzoic acid is particularly preferable.

Preferable specific examples of the 3-halo-4-hydroxybenzoic acid include vinylphenethyl 3-chloro-4-hydroxybenzoate, vinylphenylpropyl 3-chloro-4-hydroxybenzoate, (2-acryloyloxyethyl)3-chloro-4-hydroxybenzoate, (2-methacryloyloxyethyl)3-chloro-4-hydroxybenzoate, (2-acryloyloxypropyl)3-chloro-4-hydroxybenzoate, (2-methacryloyloxypropyl)3-chloro-4-hydroxybenzoate, (3-acryloyloxypropyl)3-chloro-4-hydroxybenzoate, (3-methacryloyloxypropyl)3-chloro-4-hydroxybenzoate, (4-acryloyloxybutyl)3-chloro-4-hydroxybenzoate, (4-methacryloyloxybutyl)3-chloro-4-hydroxybenzoate, (5-acryloyloxypentyl)3-chloro-4-hydroxybenzoate, (5-methacryloyloxypentyl)3-chloro-4-hydroxybenzoate, (6-acryloyloxyhexyl)3-chloro-4-hydroxybenzoate, (6-methacryloyloxyhexyl)3-chloro-4-hydroxybenzoate, (8-acryloyloxyoctyl)3-chloro-4-hydroxybenzoate, and (8-methacryloyloxyoctyl)3-chloro-4-hydroxybenzoate.

Other examples of the electron accepting compound include: styrene sulfonylaminosalicylic acid, vinylbenzyloxyphthalic acid, zinc β-methacryloxyethoxysalicylate, zinc β-cryloxyethoxysalicylate, vinyloxyethyloxybenzoic acid, β-methacryloxyethylorsellinate, β-acryloxyethylorsellinate, β-methacryloxyethoxyphenol, β-acryloxyethoxyphenol, β-methacryloxyethyl-β-resorcinate, β-acryloxyethyl-β-resorcinate, hydroxystyrene sulfonic acid N-ethylamide, β-methacryloxypropyl-p-hydroxybenzoate, β-acryloxypropyl-p-hydroxybenzoate, methacryloxymethylphenol, acryloxymethylphenol, methacrylamide propanesulfonic acid, acrylamide propanesulfonic acid, β-methacryloxyethoxydihydroxybenzene, β-acryloxyethoxydihydroxybenzene, and γ-styrenesulfonyloxy-β-methacryloxypropanecarboxylic acid;

γ-acryloxypropyl-α-hydroxyethyloxysalicylic acid, β-hydroxyethoxyphenol, β-methacryloxyethyl-p-hydroxycinnamate, β-acryloxyethyl-p-hydroxycinnamate, 3,5-distyrenesulfonic acid amidephenol, methacryloxyethoxyphthalic acid, acryloxyethoxyphthalic acid, methacrylic acid, acrylic acid, methacryloxyethoxyhydroxynaphthoic acid, acryloxyethoxyhydroxynaphthoic acid, 3-β-hydroxyethoxyphenol, β-methacryloxyethyl-p-hydroxybenzoate, β-acryloxyethyl-p-hydroxybenzoate, β'-methacryloxyethyl-β-resorcinate, β-methacryloxyethyloxycarbonylhydroxybenzoic acid, β-acryloxyethyloxycarbonylhydroxybenzoic acid, N,N'-di-β-methacryloxyethylaminosalicylic acid, N,N'-di-β-acryloxyethylaminosalicylic acid, N,N'-di-β-methacryloxyethylaminosulfonylsalicylic acid, N,N'-di-β-acryloxyethylaminosulfonylsalicylic acid, and metal salt (such as a zinc salt) thereof.

Other than the above-listed substances, examples of the electron accepting compound further include phenol derivatives, salicylic acid derivatives, metallic salts of aromatic carboxylic acids, acid clay, bentonite, novolak resins, metal-treated novolak resins and metallic complexes. These compounds are described, for example in Japanese Patent Publication (JP-B) Nos. 40-9309 and 45-14039, JP-A Nos. 52-140483, 48-51510, 57-210886, 58-87089, 59-11286, 60-176795 and 61-95988, the disclosures of which are incorporated by reference herein. Specific examples of the compounds are listed below:

Examples of the phenol derivative include 2,2'-bis(4-hydroxyphenyl)propane, 4-t-butylphenol, 4-phenylphenol, 4-hydroxydiphenoxide, 1,1'-bis(3-chloro-4-hydroxyphenyl)cyclohexane, 1,1'-bis(4-hydroxyphenyl)cyclohexane, 1,1'-bis(3-chloro-4-hydroxyphenyl)-2-ethylbutane, 4,4'-sec-isoctylidendiphenol, 4,4'-sec-butylidendiphenol, 4-tert-octylphenol, 4-p-methylphenylphenol, 4,4'-methylcyclohexylidenphenol, 4,4'-isopentylidenphenol, and benzyl p-hydroxybenzoic acid.

Examples of the salicylic acid derivative include 4-pentadecylsalicylic acid, 3,5-di(α-methylbenzyl)salicylic acid, 3,5-di(tert-octyl)salicylic acid, 5-octadecylsalicylic acid, 5-α-(p-α-methylbenzylphenyl)ethylsalicylic acid, 3-α-methylbenzyl-5-tert-octylsalicylic acid, 5-tetradecylsalycylic acid, 4-hexyloxysalicylic acid, 4-cyclohexyloxysalicylic acid, 4-decyloxysalicylic acid, 4-dodecyloxysalicylic acid, 4-pentadecyloxysalicylic acid, 4-octadecyloxysalicylic acid, zinc salts thereof, aluminum salts thereof, calcium salts thereof, and copper salts thereof.

The content of the electron accepting compound in the heat-sensitive recording layer of the invention is preferably from 0.5 to 20 parts by mass, and more preferably from 3 to 10 parts by mass, per 1 part by mass of the electron donating dye precursor. When the content of the electron accepting compound is within the range, sufficient color optical density can be obtained without decrease in sensitivity or deterioration of coatability.

(2) Combination of a Diazonium Salt Compound and a Coupling Component

The diazonium salt compound used in the invention may be, for example, a compound represented by $Ar_1—N_2^+ \cdot X^-$ (Ar represents an aromatic ring group, and $X^-$ represents an acid anion). This diazonium salt compound has such characteristics that the diazonium compound quickly undergoes a coupling reaction with the coupler compound described below to develop color when heated and that the diazonium compound is degraded by light. It is possible to control the absorption peak wavelength of the diazonium compound by selecting positions or types of substituents on $Ar_1$ (aromatic ring group) portion.

$Ar_1$ represents a substituted or non-substituted aryl group. Examples of the substituent on $Ar_1$ include alkyl groups, alkoxy groups, alkylthio groups, aryl groups, aryloxy groups, arylthio groups, acyl groups, alkoxycarbonyl groups, carbamoyl groups, carboamide groups, sulfonyl groups, sulfamoyl groups, sulfonamide groups, ureido groups, halogen groups, amino groups, heterocyclic groups, nitro group, and cyano group. These substituents may be further substituted.

Among the aryl groups, aryl groups each having 6 to 30 carbon atoms are preferable. Examples thereof include phenyl group, 2-methylphenyl group, 2-chlorophenyl group, 2-methoxyphenyl group, 2-butoxyphenyl group, 2-(2-ethylhexyloxy)phenyl group, 2-octyloxyphenyl group, 3-(2,4-di-t-pentylphenoxyethoxy)phenyl group, 4-chlorophenyl group, 2,5-dichlorophenyl group, 2,4,6-trimethylphenyl group, 3-chlorophenyl group, 3-methylphenyl group, 3-methoxyphenyl group, 3-butoxyphenyl group, 3-cyanophenyl group, 3-(2-ethylhexyloxy)phenyl group, 3,4-dichlorophenyl group, 3,5-dichlorophenyl group, 3,4-dimethoxyphenyl group, 3-(dibutylaminocarbonylmethoxy)phenyl group, 4-cyanophenyl group, 4-methylphenyl group, 4-methoxyphenyl group, 4-butoxyphenyl group, 4-(2-ethylhexyloxy)phenyl group, 4-benzylphenyl group, 4-aminosulfonylphenyl group, 4-N,N-dibutylaminosulfonylphenyl group, 4-ethoxycarbonylphenyl group, 4-(2-ethylhexylcarbonyl)phenyl group, 4-fluorophenyl group, 3-acetylphenyl group, 2-acetylaminophenyl group, 4-(4-chlorophenylthio)phenyl group, 4-(4-methylphenyl)thio-2,5-butoxyphenyl group, and 4-(N-benzyl-N-methylamino)-2-dodecyloxycarbonylphenyl group.

Further, these groups may be substituted by an alkyloxy group, an alkylthio group, a substituted phenyl group, a cyano group, a substituted amino group, a halogen atom, and a heterocyclic group.

$X^-$ represents an acid anion. The acid anion may be an inorganic anion or an organic anion. Examples of the inorganic anion include hexafluorophosphate ion, borofluorate ion, chloride ion and sulfate ion, among which hexafluorophosphate ion and borofluorate ion are preferable. Examples of the organic anion include polyfluoroalkyl carboxylate ion, polyfluoroalkyl sulfonate ion, tetraphenyl borate ion, aromatic carboxylate ion and aromatic sulfonate ion. Polyfluoroalkyl sulfonate ion, tetraphenyl borate ion and aromatic carboxylate ion are particularly preferable.

The content of the diazonium salt compound in the heat-sensitive recording layer of the invention is preferably 0.01 to 3 $g/m^2$, and more preferably 0.02 to 1.0 $g/m^2$. When the content of the diazonium salt compound is within the range, sufficient color development can be realized without decrease in sensitivity or elongation of suitable fixing time.

The coupler component used for the invention is capable of causing coupling reaction with the diazonium salt compound in a basic or neutral condition to form a dye. Appropriate couplers can be used together, for example, so as to obtain a desired hue. Specific examples of the couplers include resorcin, phloroglucin, 2,3-dihydroxynaphthalene, sodium 2,3-dihydroxynaphthalene-6-sulfonate, 1-hydroxy-2-naphthoic acid morpholinopropylamide, sodium 2-hydroxy-3-naphthalene sulfonate, 2-hydroxy-3-naphthalenesulfonic acid anilide, 2-hydroxy-3-naphthalenesulfonic acid morpholinopropylamide, 2-hydroxy-3-naphthalenesulfonic acid-2-ethylhexyloxypropylamide, 2-hydroxy-3-naphthalenesulfonic acid-2-ethylhexylamide, 5-acetamide-1-naphthol, sodium 1-hydroxy-8-acetamidenaphthalene-3,6-disulfonate, 1-hydroxy-8-acetamidenaphthalene-3,6-disulfonic acid dianilide, 1,5-dihydroxynaphthalene, 2-hydroxy-3-naphthoic acid morpholinopropylamide, 2-hydroxy-3-naphthoic acid octylamide, 2-hydroxy-3-naphthoic acid anilide;

5,5-dimethyl-1,3-cyclohexanedione, 1,3-cyclopentanedione, 5-(2-n-tetradecyloxyphenyl)-1,3-cyclohexanedione, 5-phenyl-4-methoxycarbonyl-1,3-cyclohexanedione, 5-(2,5-di-n-octyloxyphenyl)-1,3-cyclohexanedione, N,N'-dicyclohexylbarbituric acid, N,N'-di-n-dodecylbarbituric acid, N-n-octyl-N'-n-octadecylbarbituric acid, N-phenyl-N'-(2,5-di-n-octyloxyphenyl)barbituric acid, N,N'-bis (octadecyloxycarbonylmethyl)barbituric acid, 1-phenyl-3-methyl-5-pyrazolone, 1-(2,4,6-trichlorophenyl)-3-anilino-5-pyrazolone, 1-(2,4,6-trichlorophenyl)-3-benzamide-5-pyrazolone, 6-hydroxy-4-methyl-3-cyano-1-(2-ethylhexyl)-2-pyridone, 2,4-bis-(benzoylacetamide)toluene, 1,3-bis-(pivaloylacetamidemethyl)benzene, benzoylacetonitrile, thenoylacetonitrile, acetoacetanilide, benzoylacetanilide, pivaloylacetanilide, 2-chloro-5-(N-n-butylsulfamoyl)-1-pivaloylacetamidebenzene, 1-(2-ethylhexyloxypropyl)-3-cyano-4-methyl-6-hydroxy-1,2-dihydropyridine-2-one, 1-(dodecyloxypropyl)-3-acetyl-4-methyl-6-hydroxy-1,2-dihydropyridine-2-one, and 1-(4-n-octyloxyphenyl)-3-tert-butyl-5-aminopyrazole.

Regarding further details of the coupler compounds, the disclosure of the following publications can be referenced: JP-A Nos. 4-201483, 7-223367, 7-223368, 7-323660, 5-278608, 5-297024, 6-18669, 6-18670, and 7-316280, disclosures of which are incorporated by reference herein. References can also be made to JP-A Nos. 9-216468, 9-216469, 9-203472, 9-319025, 10-035113, 10-193801, and 10-264532 (disclosures of which are incorporated by reference herein), which were submitted by the present applicants.

The content of the coupler compound in the heat-sensitive recording layer is preferably 0.5 to 20 parts by mass, and more preferably 1 to 10 parts by mass, per 1 part by mass of the diazonium salt compound. When the content of the coupler compound is within the range, color development is effectively improved without degradation of coatability.

In an embodiment, the coupler compound is used in a form of a solid dispersion prepared by mixing the coupler compound with other components and water-soluble polymers and dispersing the mixture with a sand mill or the like. In another embodiment, the coupler compound is used in a form of an emulsion prepared by emulsifying the coupler compound with an appropriate emulsification aid. The methods for the solid dispersion or emulsification are not particularly limited, and an appropriate method may be selected from conventionally known methods. Details of these methods are disclosed in JP-A Nos. 59-190886, 2-141279 and 7-17145, the disclosures of which are incorporated by reference herein.

In a preferable embodiment, organic bases such as tertiary amines, piperidines, piperazines, amidines, formamidines, pyridines, guanidines, morpholines and the like are used in order to accelerate the coupling reaction. Examples of the organic bases are described in JP-A No. 57-123,086,60-49991, 60-94381, 9-071048, 9-077729 and 9-077737, the disclosures of which are incorporated by reference herein. The amount of organic base to be used is not particularly limited, and is preferably 1 to 30 mol per 1 mol of the diazonium salt compound.

In an embodiment, the heat-sensitive recording material of the invention is produced as follows: A support is coated with a coating liquid. The coating liquid includes a microcapsule of the invention. The microcapsule contains, as the core substance, the coloring component (a) or the component (b) capable of reacting with the coloring component (a) to develop color. The coating liquid on the support is dried to form a heat-sensitive recording layer. The composition of the heat-sensitive recording layer in the embodiment is not particularly limited, and may further include an oil component, an organic solvent, or other additives. Such additives, the component (a), and the component (b) may be included in the same recording layer, or the heat-sensitive recording layer may include a lamination of sub-layers each including some substances selected from the above substances.

The method of applying the coating liquid can be suitably selected from known coating methods such as bar coating, blade coating, air knife coating, gravure coating, roll coating, spray coating, dip coating and curtain coating. The coating liquid is applied preferably in such an amount that the solid amount of the recording layer after drying is 2 to 30 g/m$^2$.

The support of the heat-sensitive recording material of the invention can be suitably selected from known supports, and examples include neutral paper, acidic paper, recycle paper, polyolefin resin laminate paper, synthetic paper, polyester film, cellulose derivative films such as triacetate cellulose film, polystyrene films, and polyolefin films such as polypropylene films and polyethylene films. The support may be composed of a single support, or the support may comprise a lamination of a plurality of supports.

The thickness of the support is preferably 20 to 200 µm. In an embodiment, the recording material includes an undercoat layer and/or a back layer on the support. It is also possible to provide an intermediate layer between the support and the recording layer. This constitution is described in JP-A No. 61-54980, the disclosure of which is incorporated herein by reference.

The heat-sensitive recording material of the invention may further include layers on the support other than the heat-sensitive recording layer in accordance with the necessity. For example, a protective layer may be provided in order to prevent sticking and head staining at printing with a thermal head or to impart water resistance to the recording material. The protective layer includes a polyvinyl alcohol as a main component, and other optional components such as pigments, lubricants and releasing agents.

From the viewpoint of achievement of light resistance and light fixability, a compound having a function of controlling the UV transmittance can be further included in the protective layer. Heat-sensitive recording materials including the compound having a UV transmittance controlling function are described in detail in JP-A No. 7-276808, the disclosure of which is incorporated herein by reference.

The heat-sensitive recording material of the invention may be a multicolor heat-sensitive recording material including, on a support, a lamination of a plurality of single-color recording layers each of which develops a color of a different hue.

In an embodiment, the multicolor heat-sensitive recording material includes heat-sensitive recording layers A, B, and C. The layers B and C each includes a combination of a diazonium salt compound (the coloring component (a)) and a coupler compounds capable of reacting with the diazonium salt upon application of heat to develop color. The diazonium salt compounds in each of the layers B and C has sensitivity to a light of a different wavelength. The combination of the diazonium salt compound and the coupler in each of the layers B and C develops a color of a different hue. The layer A includes a combination of an electron-donating colorless dye and an electron-accepting compound. In this case, the hues of the colors developed by respective heat-sensitive recording layers may be yellow, magenta, and cyan which are the three primary colors of the subtractive color system so as to realize a full-color image recording.

In another embodiment, the heat-sensitive recording material includes, on a support, a lamination of heat-sensitive recording layers A', B' and C' in the order from the support. The layers A', B' and C' each includes a combination of a diazonium salt compound and a coupler compounds capable of reacting with the diazonium salt upon application of heat to develop color. The diazonium salt compounds in each of the layers A', B' and C' has sensitivity to a light of a different wavelength. The combinations of the diazonium salt compound and the coupler in each of the layers A', B' and C' develops a color of a different hue. The respective layers are preferably laminated in such an order that the yellow layer having low visibility is disposed as the lowest layer, in order to reduce the influence of the roughness of the support surface on the image quality, thus improving the image quality.

The method (R4) comprises adding a solution including a capsule wall material to an aqueous phase medium, emulsifying the mixture liquid to form a primary dispersed particle, adding an oil phase solution including a diazonium salt represented by the formula (I) or (II) to the mixture liquid, emulsifying the mixture liquid to form a secondary dispersed particle, and forming a capsule wall at the interface of the secondary dispersed particle.

In the method (R4), the mixing ratio by mass of (the wall material solution/aqueous phase solution) at the first emulsification is preferably 5/95 to 90/10, more preferably 5/95 to 70/30, most preferably 5/95 to 60/40, in order to conduct the emulsification stably. When the ratio is lower than 5%, the desired diameter of the dispersed particles may not be obtained, while when the ratio is higher than 90%, emulsification is likely to be difficult, formation of capsules is likely to be difficult and capsules are likely to aggregate easily.

In the method (R4), the emulsification temperatures at the first and emulsifications are preferably in the range of 0° C. to 50° C., more preferably 0° C. to 45° C., most preferably 10°

C. to 45° C. When the emulsification temperature is lower than 0° C., the aqueous phase may be solidified. When the emulsification temperature is higher than 50° C., the capsulation reaction may be initiated at the emulsification to cause aggregation.

The method (R5) comprises adding an oil phase solution including a diazonium salt represented by the formula (I) or (II) to a first aqueous phase medium to form a first mixture liquid, emulsifying the first mixture liquid to form a first primary dispersed particle, adding a solution including a capsule wall material to a second aqueous phase medium to form a second mixture liquid, emulsifying the second mixture liquid to form a second primary dispersed particle, mixing and dispersing the first mixture liquid and the second mixture liquid to form a secondary dispersed particle, and forming a capsule wall at the interface of the secondary dispersed particle.

In the method (R5), the mixing ratio by mass of (the oil phase solution/aqueous phase solution) in the first mixture liquid is preferably 5/95 to 90/10, more preferably 10/90 to 70/30, most preferably 15/85 to 60/40, in order to conduct the emulsification stably. When the ratio is lower than 5%, the desired diameter of the dispersed particles may not be obtained, while when the ratio is higher than 90%, emulsification is likely to be difficult, formation of capsules is likely to be difficult and capsules are likely to aggregate easily.

In the method (R5), the emulsification temperature at the first emulsification may be selected arbitrarily within the temperature range of 0° C. to 100° C., in which the aqueous phase is in the form of a liquid. The mixing ratio by mass of (the wall material solution/aqueous phase solution) in the second mixture liquid is preferably 5/95 to 90/10, more preferably 5/95 to 70/30, most preferably 5/95 to 60/40. When the ratio is lower than 5%, the desired diameter of the dispersed particles may not be obtained. When the ratio is higher than 90%, emulsification is likely to be difficult, formation of capsules is likely to be difficult and capsules are likely to aggregate easily.

The emulsification temperatures at the first, second and third emulsifications are preferably in the range of 0° C. to 50° C., more preferably 0° C. to 45° C., most preferably 10° C. to 45° C. When the emulsification temperatures are lower than 0° C., the aqueous phase may be solidified. When the emulsification temperatures are higher than 50° C., the capsulation reaction may be initiated at the emulsification to cause aggregation.

In an embodiment, every emulsification can be conducted easily by a known emulsification apparatus. Examples of the known apparatus include a homogenizer, manton gaulin, ultrasonic disperser, a dissolver, or Keddy mill. The emulsifier and emulsification conditions in each step may be the same of different. In the method (R5), any two of the three emulsification processes may have the same emulsification conditions and/or may use the same emulsifier.

After the secondary dispersed particle is emulsified, the secondary dispersed particle is used for the capsule formation. In the capsule formation, the emulsion including the secondary dispersed particle is heated to a temperature of 25 to 80° C., preferably 30 to 70° C., for the purpose of promoting the capsule forming reaction. In an embodiment, in the capsule forming reaction, water is added to reduce the probability of collision of the capsules or the emulsion is sufficiently stirred, in order to prevent the aggregation of capsules. In the capsule formation, an additional dispersion for preventing aggregation may be added to the emulsion.

When the polyvalent isocyanate compound or the like is used, generation of carbon dioxide gas is observed as the polymerization reaction proceeds, and the cessation of the gas generation can be regarded as the end point of the polymerization reaction. When carbon dioxide gas is not generated, the disappearance or cessation of consumption of the monomer component or capsule wall precursor may be regarded as the indicator of the completion of the reaction.

However, in practice, the reaction does not have to proceed to 100% completion, and the reaction can be ceased when the reaction have proceeded to practically sufficient degree. Usually, the reaction is conducted for dozens of minutes to several hours during which the reaction proceeds to the practically sufficient degree to form the desired microcapsule.

(Diazonium Salt Compound)

In each of heat-sensitive recording materials (S1) and (S2) as examples of the heat-sensitive recording material in the invention, the heat-sensitive recording layer coating liquid includes a diazonium salt represented by the following formula (I) or (II) and a coupler compound capable of reacting with the diazonium salt to form an azo colorant. The reaction between the diazonium salt and the coupler is a coupling reaction. The heat-sensitive recording layer coating liquid is applied to form a heat-sensitive recording layer

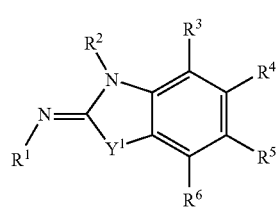

Formula (I)

In the formula (I), $R^1$ and $R^2$ each independently represent an alkyl group, an alkoxy group, an alkylthio group, an arylthio group or an alkylamino group. $R^3$ to $R^6$ each independently represent a hydrogen atom, a halogen atom, an alkyl group, an alkoxy group, an aryl group, an aryloxy group, an alkylthio group, an arylthio group, an alkylamino group or a $-N_2^+X^-$ group. At least one of $R^3$ to $R^6$ represents a $-N_2^+X^-$ group wherein $X^-$ represents a monovalent counter anion. $Y^1$ represents a sulfur atom, an oxygen atom, or a nitrogen atom to which an alkyl group is bound.

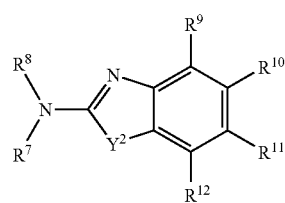

Formula (II)

In the formula (II), $R^7$ and $R^8$ each independently represent a hydrogen atom, an alkyl group, an alkoxy group, an aryl group, an alkylthio group, an arylthio group or an alkylamino group. $R^7$ and $R^8$ may be bound to each other to form a nitrogen-containing ring. $R^9$ to $R^{12}$ each independently represent a hydrogen atom, a halogen atom, an alkyl group, an alkoxy group, an aryl group, an aryloxy group, an alkylthio group, an alkylamino group or a $-N_2^+X^-$ group. At least one of $R^9$ to $R^{12}$ represents a $-N_2^+X^-$ group wherein $X^-$ is a monovalent counter anion. $Y^2$ represents a sulfur atom, an oxygen atom, or a nitrogen atom to which an alkyl group is bound.

If any of $R^1$ to $R^{12}$ represents an alkyl group, the alkyl group may be substituted or unsubstituted, and is preferably a C1 to C30 alkyl group, particularly preferably a C1 to C20 alkyl group. Specifically, the alkyl group is preferably a methyl group, an ethyl group, an isopropyl group, an n-butyl group, a t-butyl group, an isopentyl group, a 3-pentyl group, a t-amyl group, an n-hexyl group, a cyclohexyl group, an n-octyl group, a t-octyl group, a 2-ethylhexyl group, an isononyl group, an n-dodecyl group, a hexadecyl group, a 3,5,5-trimethylhexyl group, an octadecyl group, a benzyl group, a 4-methoxybenzyl group, a 2-methylbenzyl group, a phenethyl group, a 4-chlorobenzyl group, a 2,4-dichlorobenzyl group, a (4-ethoxyphenyl)methyl group, an N,N-diethylcarbamoylmethyl group, an N,N-dibutylcarbamoylmethyl group, a 1-(N,N-dibutylcarbamoyl)ethyl group or a 2-methoxyethyloxy group, more preferably a butyl group, a hexyl group, a benzyl group, a 4-chlorobenzyl group, a 2,4-dichlorobenzyl group, an N,N-dibutylcarbamoylmethyl group or a 1-(N,N-dibutylcarbamoyl)ethyl group.

If any of $R^1$ to $R^{12}$ represents an alkoxy group, the alkoxy group may be substituted or unsubstituted, and is preferably a C1 to C30 alkoxy group, particularly preferably a C1 to C20 alkoxy group. Specifically, the alkoxy group is preferably a methoxy group, an ethoxy group, a propoxy group, a butoxy group, a hexyloxy group, a 2-ethylhexyloxy group, a 3,5,5-trimethylhexyloxy group, an octyloxy group, a decyloxy group, a 2-phenoxyethoxy group, a 2-(3,5-di-t-butylphenoxy)ethoxy group, a dibutylcarbamoylmethoxy group, a hexadecyloxy group or an octadecyloxy group, particularly preferably a methoxy group, an ethoxy group, a butoxy group, a hexyloxy group, a 2-ethylhexyloxy group, a 3,5,5-trimethylhexyloxy group, a 2-phenoxyethoxy group or a dibutylcarbamoylmethoxy group.

If any of $R^1$ to $R^{12}$ represents an alkylthio group, the alkylthio group may be substituted or unsubstituted, and is preferably a C1 to C30 alkylthio group, more preferably a C1 to C20 alkylthio group. Specifically, the alkylthio group is preferably a methylthio group, an ethylthio group, a butylthio group, a hexylthio group, a 2-ethylhexylthio group, a 3,5,5-trimethylhexylthio group, an octylthio group, a decylthio group, a 2-phenoxyethylthio group, a 2-(3,5-di-t-butylphenoxy)ethylthio group, a dibutylcarbamoylmethylthio group, a hexadecylthio group or an octadecylthio group, particularly preferably a methylthio group, an ethylthio group, a butylthio group, a hexylthio group, a 2-ethylhexylthio group, a 3,5,5-trimethylhexylthio group, a 2-phenoxyethylthio group or a dibutylcarbamoylmethylthio group.

If any of $R^1$ to $R^8$ represents an arylthio group, the arylthio group may be substituted or unsubstituted, and is preferably a C6 to C30 arylthio group, more preferably a C6 to C20 arylthio group. Specifically, the arylthio group is preferably a phenylthio group, a tolylthio group, a 4-chlorophenylthio group, a 4-acetamidephenylthio group, a 2-butoxyphenylthio group, a 2-benzoylaminophenylthio group, a 2,5-dimethoxy-4-nitrophenylthio group or a 3-octyloxyphenylthio group, particularly preferably a phenylthio group, a tolylthio group, a 4-chlorophenylthio group, a 4-acetamidephenylthio group, a 2-butoxyphenylthio group or a 2,5-dimethoxy-4-nitrophenylthio group.

If any of $R^1$ to $R^{12}$ represents an alkylamino group, the alkylamino group may be substituted or unsubstituted, and is preferably a C1 to C30 alkylamino group, more preferably a C1 to C20 alkylamino group. Specifically, the alkylamino group is preferably a methylamino group, an ethylamino group, a butylamino group, a hexylamino group, a 2-ethylhexylamino group, a 3,5,5-trimethylhexylamino group, an octylamino group, a decylamino group, a 2-phenoxyethylamino group, a 2-(3,5-di-t-butylphenoxy)ethylamino group, a dibutylcarbamoylmethylamino group, a hexadecylamino group or an octadecylamino group, particularly preferably a methylamino group, an ethylamino group, a butylamino group, a hexylamino group, a 2-ethylhexylamino group, a 3,5,5-trimethylhexylamino group, a 2-phenoxyethylamino group or a dibutylcarbamoylmethylamino group.

If any of $R^3$ to $R^6$ and $R^9$ to $R^{12}$ represents a halogen atom, the halogen atom is preferably a fluorine atom, a chlorine atom, a bromine atom or an iodine atom, and particularly preferably a fluorine atom or a chlorine atom.

If any of $R^3$ to $R^{12}$ represents an aryl group, the aryl group may be substituted or unsubstituted, and is preferably a C6 to C40 aryl group, more preferably a C6 to C20 aryl group. Specifically, the aryl group is preferably a phenyl group, a 2-methylphenyl group, a 3-methylphenyl group, a 4-methylphenyl group, a 4-phenylphenoxy group, a 4-chlorophenyl group, a 2-methoxyphenyl group, a p-methoxyphenyl group, a 3-ethoxyphenyl group, a 4-butoxyphenyl group, a 2,4-diethoxyphenyl group, a 2,5-dibutoxyphenyl group, a 4-phenoxyphenyl group, a naphthyl group, a 4-dibutylcarbamoylphenyl group, a 4-dibutylsulfamoylphenyl group, a p-(2-ethylhexyloxy)phenyl group, a 2,5-dimethylphenyl group, a 2,6-dimethoxyphenyl group or a 2,4-di-t-amylphenyl group, particularly preferably a phenyl group, a 2-methylphenyl group, a 3-methylphenyl group, a 4-methylphenyl group, a 4-chlorophenyl group, a 2-methoxyphenyl group, a 3-ethoxyphenyl group or a 4-butoxyphenyl group.

If any of $R^3$ to $R^6$ and $R^9$ to $R^{12}$ represents an aryloxy group, the aryloxy group may be substituted or unsubstituted, and is preferably a C6 to C40 aryloxy group, more preferably a C6 to C20 aryloxy group. Specifically, the aryloxy group is preferably a phenoxy group, a 4-methylphenoxy group, a 2-methylphenoxy group, a 2-chlorophenoxy group, a 2,6-dimethylphenoxy group, a 4-t-butylphenoxy group, a 2,4-di-t-amylphenoxy group or a 1-naphthyloxy group, particularly preferably a phenoxy group or a 4-methylphenoxy group.

The ring formed by the binding between $R^7$ and $R^8$ is preferably a ring having 2 to 20 carbon atoms, and the ring may have a substituent. The ring is preferably a 5- to 8-membered ring. Specifically, the ring structure is preferably a pyrrolidine ring, a piperidine ring, a morpholine ring, a thiomorpholine ring, a hexamethylene imine ring, a heptamethylene imine ring, a phthalimide ring, a pyrrolidone ring or a piperidone ring, each of which may further have a substituent.

If any of the alkyl group, alkoxy group, alkylthio group, arylthio group, alkylamino group, aryl group or aryloxy group has a substituent group, the substituent group is preferably an aryl group, a halogen atom, an alkoxy group, an aryloxy group, an alkoxycarbonyl group, an acyloxy group, an acylamino group, a carbamoyl group, a cyano group, a carboxylic acid group, a sulfonic acid group or a heterocyclic group.

At least one of $R^3$ to $R^6$ and $R^9$ to $R^{12}$ represents a diazonio group ($-N_2^+X^-$) wherein $X^-$ represents a counter anion, and the counter anion may be an organic anion or an inorganic anion.

Specific examples of the inorganic anion include a hexafluorophosphate ion, a borofluorate ion, a chloride ion and a sulfate ion, among which a hexafluorophosphate ion and a borofluorate ion are particularly preferable.

Examples of the organic anion include a C1 to C9 polyfluoroalkyl carboxylate ion, a C1 to C9 polyfluoroalkyl sulfonate ion, an aromatic carboxylate ion, an aromatic sulfonate ion, a disulfonimide ion, a boron tetrafluoride ion, a tetraphenyl boron ion, and a hexafluorophosphate ion. A hexafluorophosphate ion is preferable because it has crystallizability. The ions described in JP-A Nos. 2003-300953 (the disclosure of which is incorporated by reference herein) are also preferably used.

If any of $Y^1$ and $Y^2$ represents a nitrogen atom to which an alkyl group is bound, scope, examples, and preferable examples thereof are the same as in the explanation of the alkyl group represented by $R^1$ or $R^2$.

From the viewpoint of further improving raw storage stability and surface whiteness, in an embodiment, a diazonium salt compound represented by the following formula (III) is used as the diazonium salt contained in the microcapsule in the heat-sensitive recording layer coating liquid for the heat-sensitive recording material (S1).

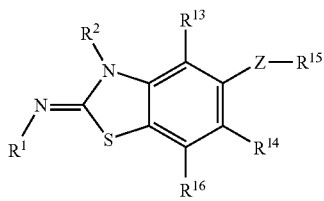

Formula (III)

In the formula (III), $R^1$, $R^2$ and $R^{16}$ each independently represent an alkyl group, an alkoxy group, an alkylthio group, an arylthio group or an alkylamino group. One of $R^{13}$ or $R^{14}$ represents a $-N_2^+X^-$ group, and the other one of $R^{13}$ or $R^{14}$ represents a hydrogen atom, a halogen atom, an alkyl group, an alkoxy group, an aryl group, an aryloxy group, an alkylthio group or an alkylamino group. $X^-$ represents a monovalent counter anion. $R^{15}$ represents an alkyl group or an aryl group. Z represents an oxygen atom or a sulfur atom.

If any of $R^1$, $R^2$, and $R^{13}$ to $R^{16}$ represents an alkyl group, the alkyl group is preferably a C1 to C20 alkyl group, more preferably a C1 to C16 alkyl group. Specific examples include a methyl group, an ethyl group, a butyl group, a hexyl group, an octyl group, a 2-ethylhexyl group, a 3,5,5-trimethylhexyl group, a dodecyl group, an octadecyl group, a (4-ethoxyphenyl)methyl group, a N,N-diethylcarbamoylmethyl group, a N,N-dibutylcarbamoylmethyl group, a 1-(N,N-dibutylcarbamoyl)ethyl group, and a 2-methoxyethyloxy group. A butyl group, a hexyl group, an N,N-diethylcarbamoylmethyl group, an N,N-dibutylcarbamoylmethyl group and a 1-(N,N-dibutylcarbamoyl)ethyl group are preferable.

If any of $R^1$, $R^2$ and $R^{16}$ represents an alkoxy group, an alkylthio group, an arylthio group or an alkylamino group, the scope, examples, and preferable examples thereof are the same as in the explanation of $R^1$ and $R^2$ in the formula (I) above.

If any of $R^{13}$ to $R^{15}$ represents an aryl group, the aryl group is preferably a C6 to C30 aryl group, more preferably a C6 to C20 aryl group. Specifically, the aryl group is preferably a phenyl group, a 2-methylphenyl group, a 3-methylphenyl group, a 4-methylphenyl group, a 4-phenylphenoxy group, a 4-chlorophenyl group, a 2-methoxyphenyl group, a 3-ethoxyphenyl group, a 4-butoxyphenyl group, a 2,4-diethoxyphenyl group, a 2,5-dibutoxyphenyl group, a 4-phenoxyphenyl group, a naphthyl group, a 4-butylcarbamoylphenyl group, a 4-dibutylsulfamoylphenyl group or a 2,4,6-tris(trifluoromethyl)phenyl group. A phenyl group, a 2-methylphenyl group, a 3-methylphenyl group, a 4-methylphenyl group, a 4-chlorophenyl group, a 2-methoxyphenyl group, a 3-ethoxyphenyl group and a 4-butoxyphenyl group are preferable.

The $-N_2^+X^-$ group, halogen atom, alkoxy group, aryloxy group, alkylthio group or alkylamino group represented by $R^{13}$ or $R^{14}$ has the same scope, examples, and preferable examples as in the explanation of $R^3$ to $R^6$ in the formula (I) above.

The maximum absorption wavelength $\lambda_{max}$ of the diazonium salt used in the invention is preferably in the range of 300 to 500 nm, more preferably 320 to 460 nm. When the maximum absorption wavelength $\lambda_{max}$ is in the above range, raw storage stability is improved, and image fixation, image storability, and hue can be improved when combined with the coupler compound described later.

The diazonium salt in the invention preferably belongs to such a structural series that structures having 12 or more carbon atoms in the structural series have solubilities of 1 wt % or lower in water and solubilities of 5 wt % or higher in ethyl acetate. In the invention, only a single diazonium salt may be used or two or more diazonium salts may be used in combination so as to, for example, control the hue.

The diazonium salt may be in an oily state or in a crystalline state, preferably in a crystalline state in respect of handling easiness. Only a single diazonium salt may be used or two or more diazonium salts may be used.

The content of the diazonium salt in the heat-sensitive recording layer of the invention is preferably in the range of 0.02 to 5 g/m$^2$, more preferably in the range of 0.05 to 3 g/m$^2$ from the viewpoint of the optical density of the developed color. For stabilization of the diazonium salt, it is possible to use zinc chloride, cadmium chloride, tin chloride or the like to form a complex compound thereby stabilizing the diazonium compound.

Examples of the diazonium salts used in the invention (Exemplary Compounds A-1 to A-103) are shown below. However, the diazonium salts of the invention are not limited to these examples.

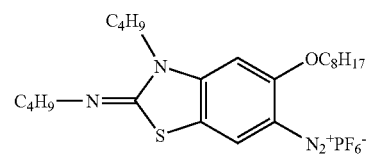

A-1

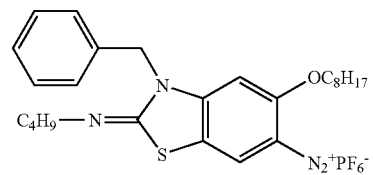

A-2

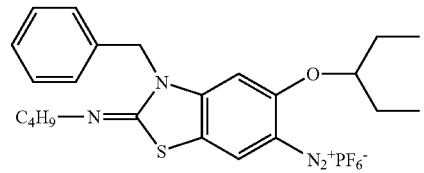

A-3

-continued
A-4
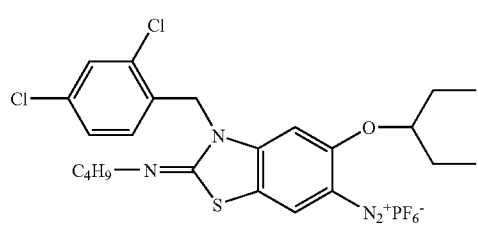
A-5
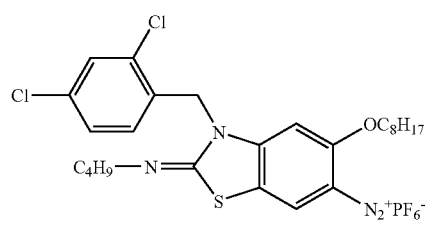
A-6
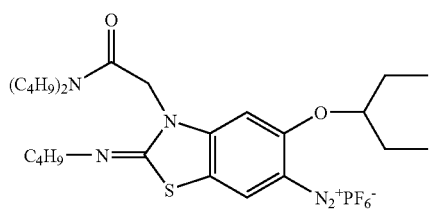
A-7
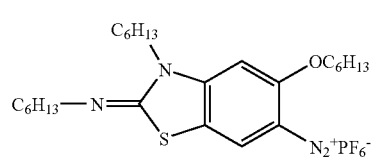
A-8
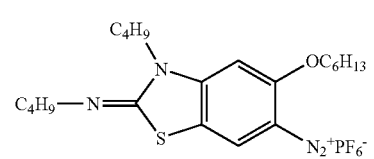
A-9
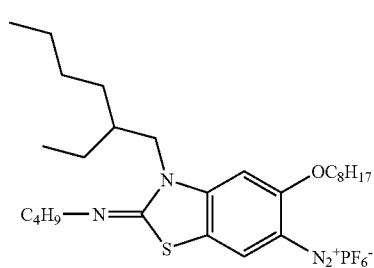
A-10
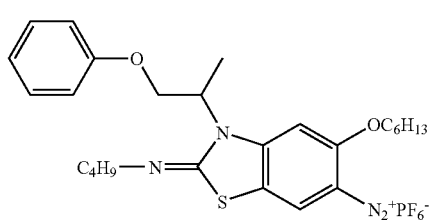
-continued
A-11
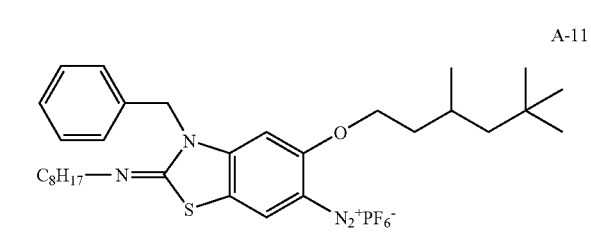
A-12
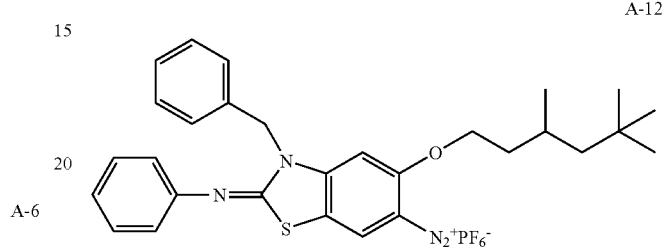
A-13
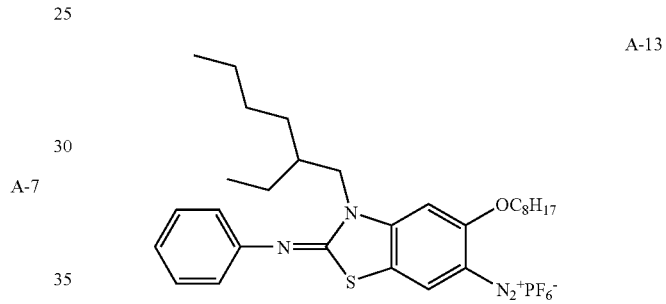
A-14
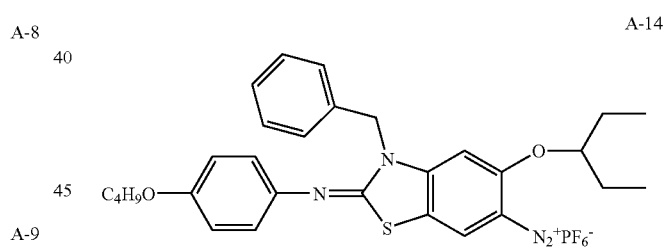
A-15
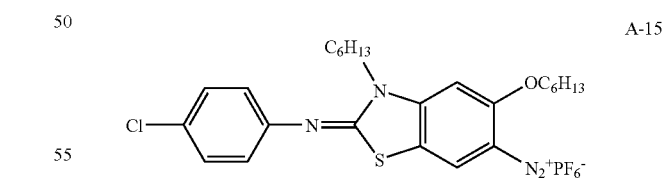
A-16
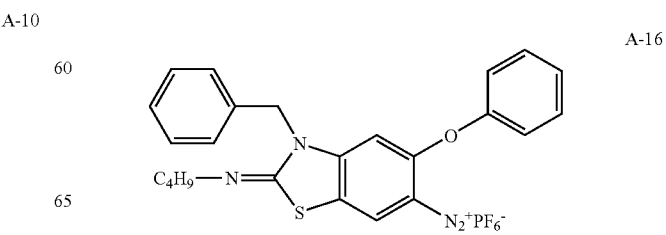

-continued
A-17
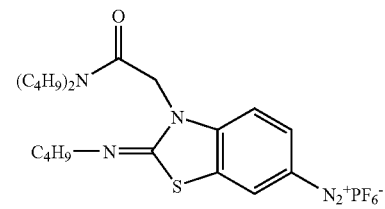
A-18
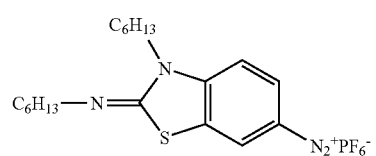
A-19
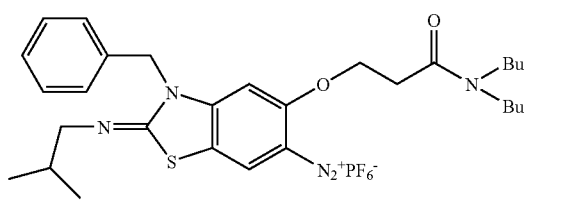
A-20
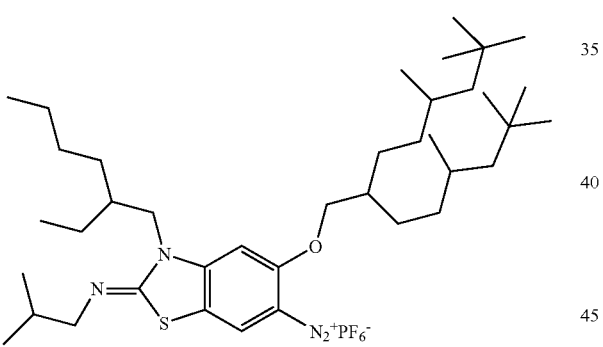
A-21
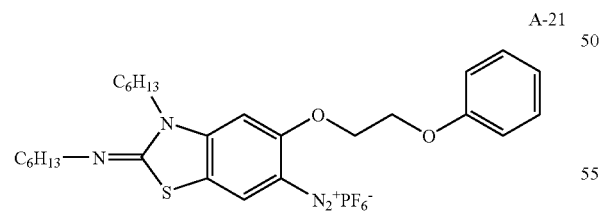
A-22
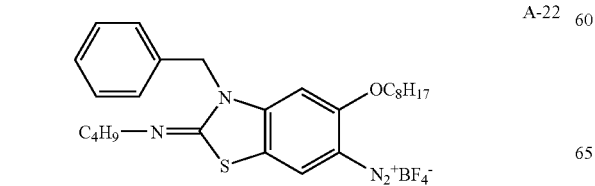
-continued
A-23
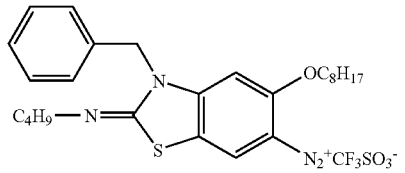
A-24
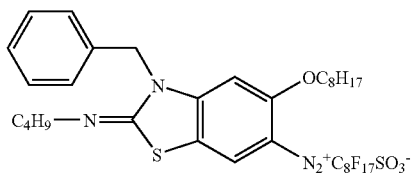
A-25
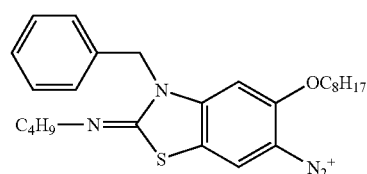
A-26
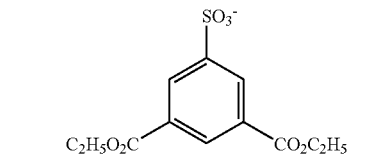
A-27
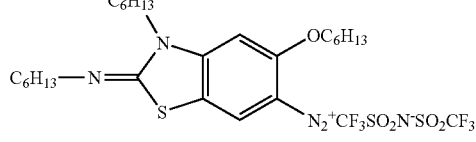
A-28
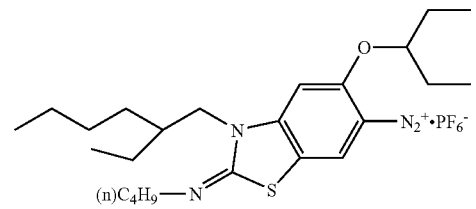
A-29
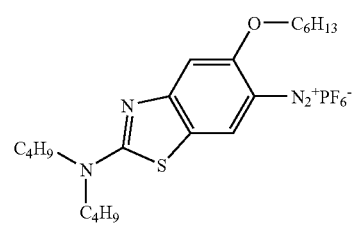

-continued
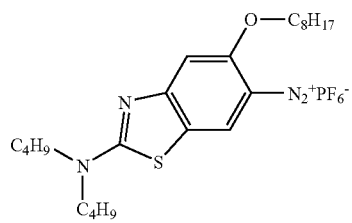
A-30
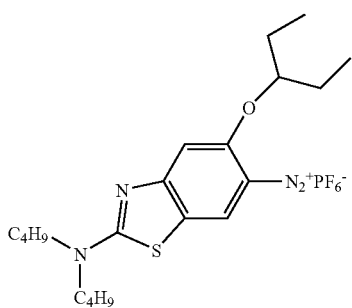
A-31
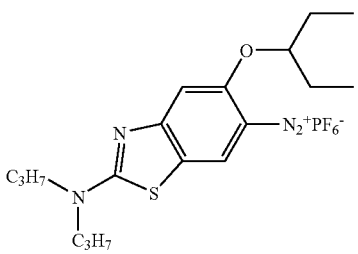
A-32
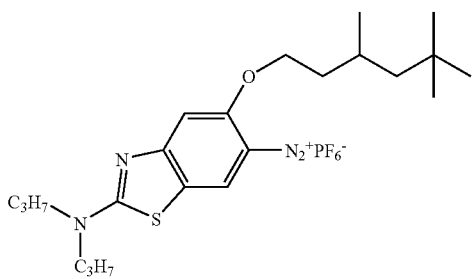
A-33
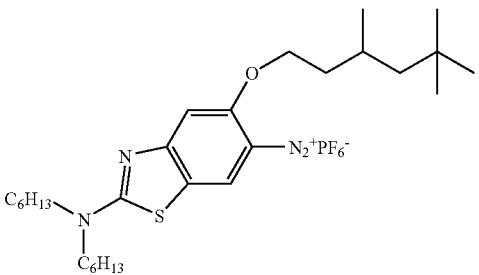
A-34
-continued
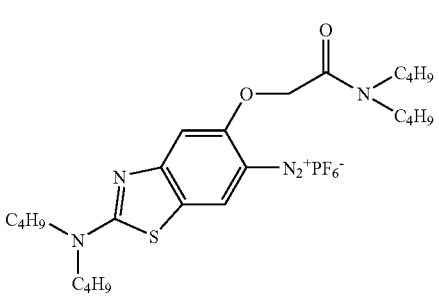
A-35
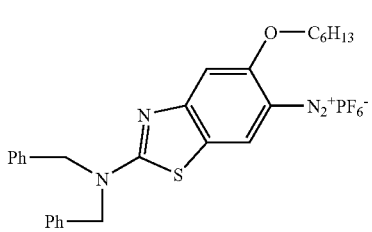
A-36
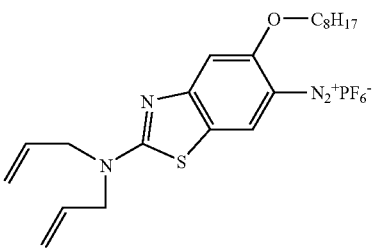
A-37
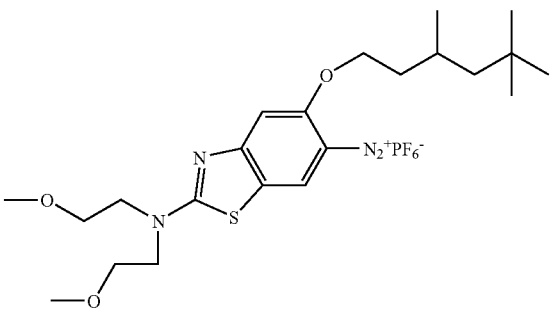
A-38
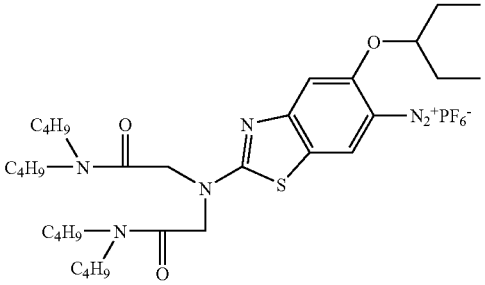
A-39

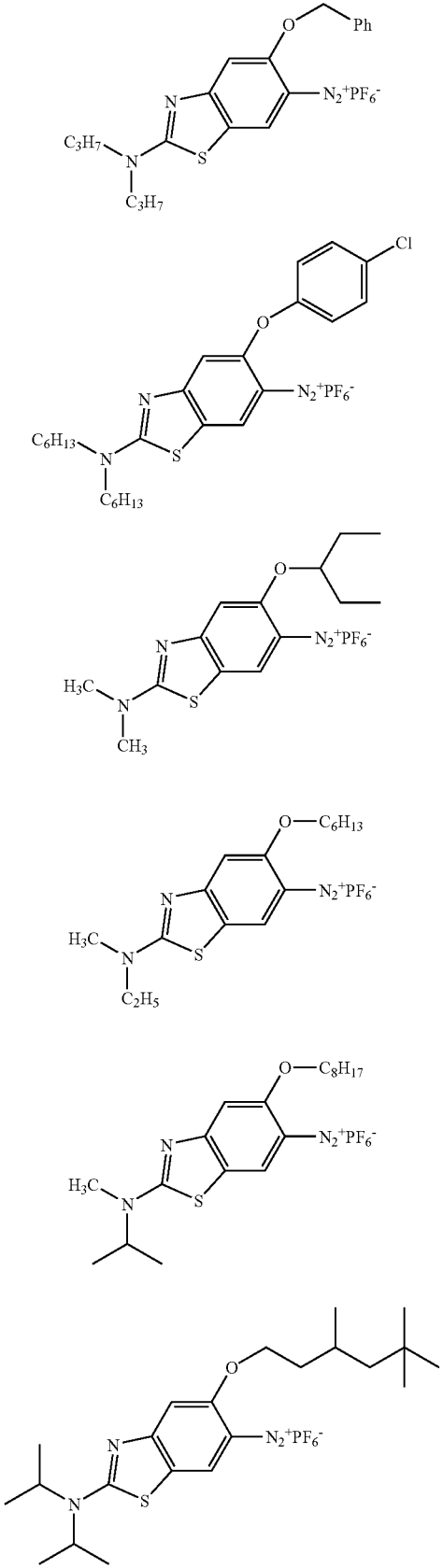

-continued
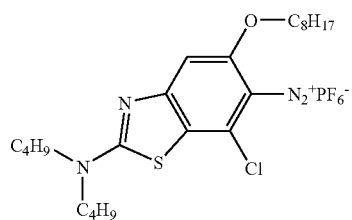
A-51
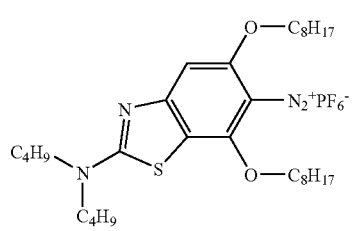
A-52
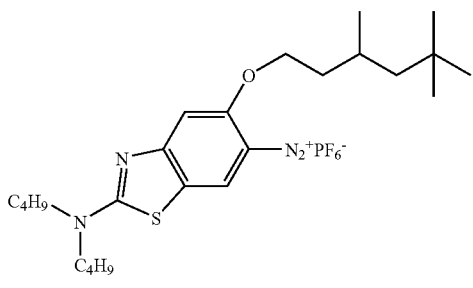
A-53
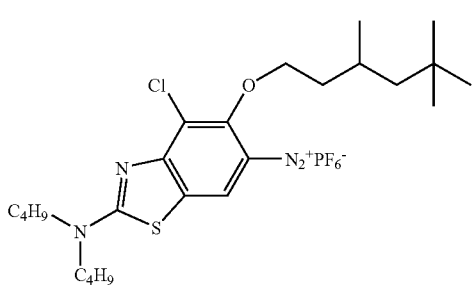
A-54
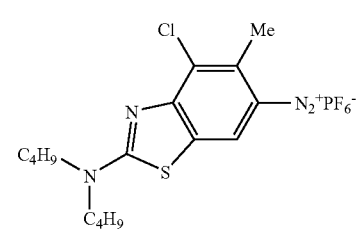
A-55
-continued
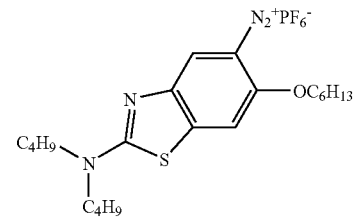
A-56
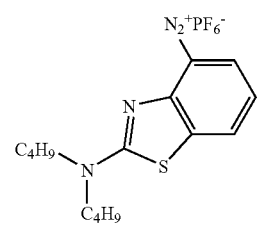
A-57
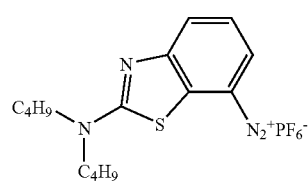
A-58
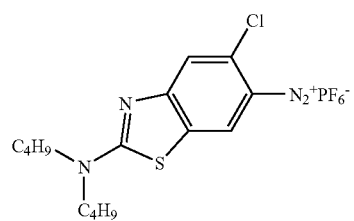
A-59
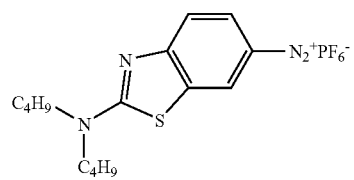
A-60
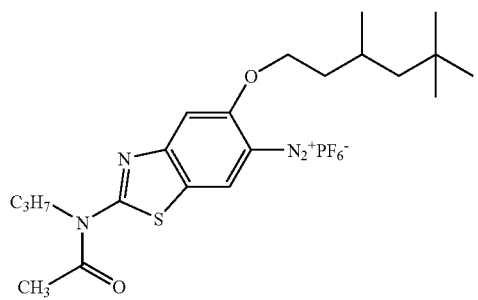
A-61
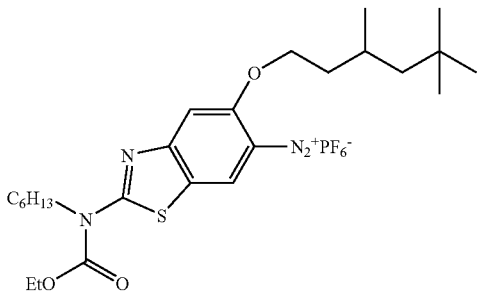
A-62

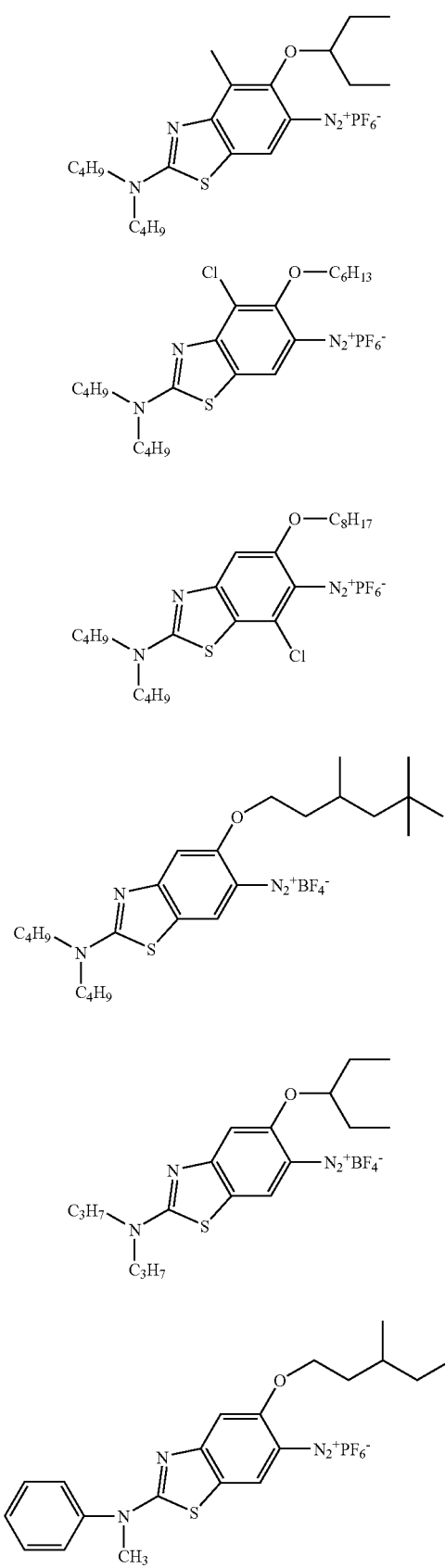

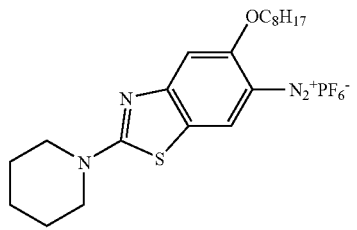
A-75
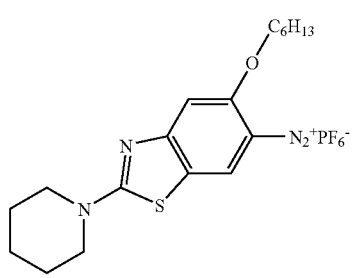
A-76
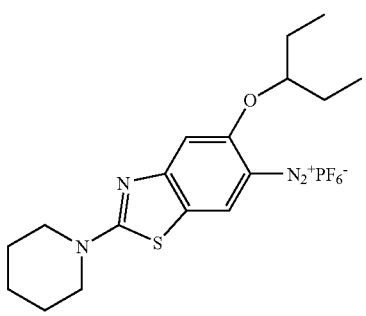
A-77
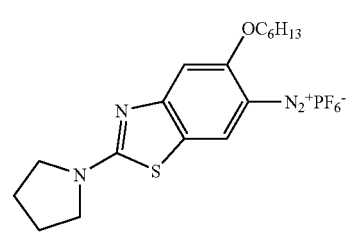
A-78
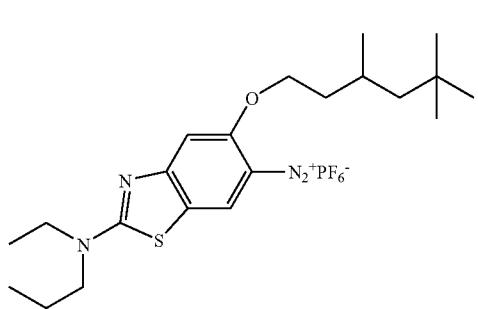
A-79
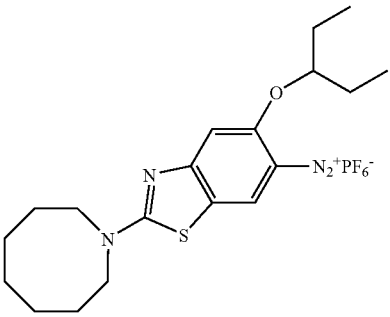
A-80
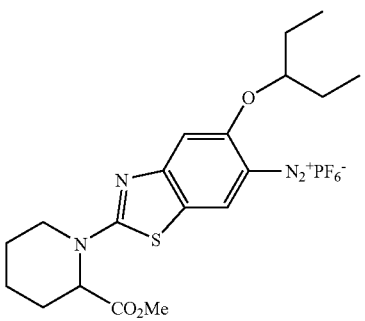
A-81
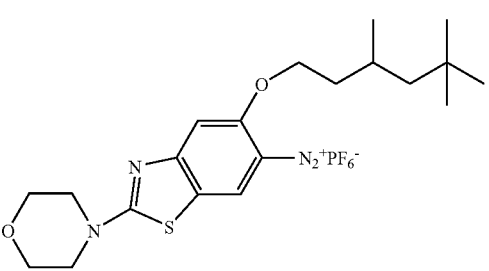
A-82
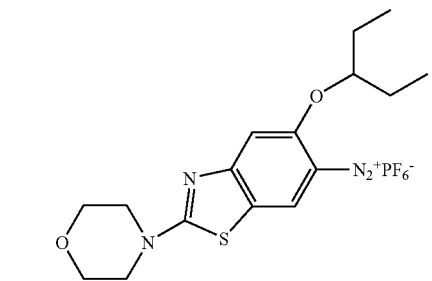
A-83

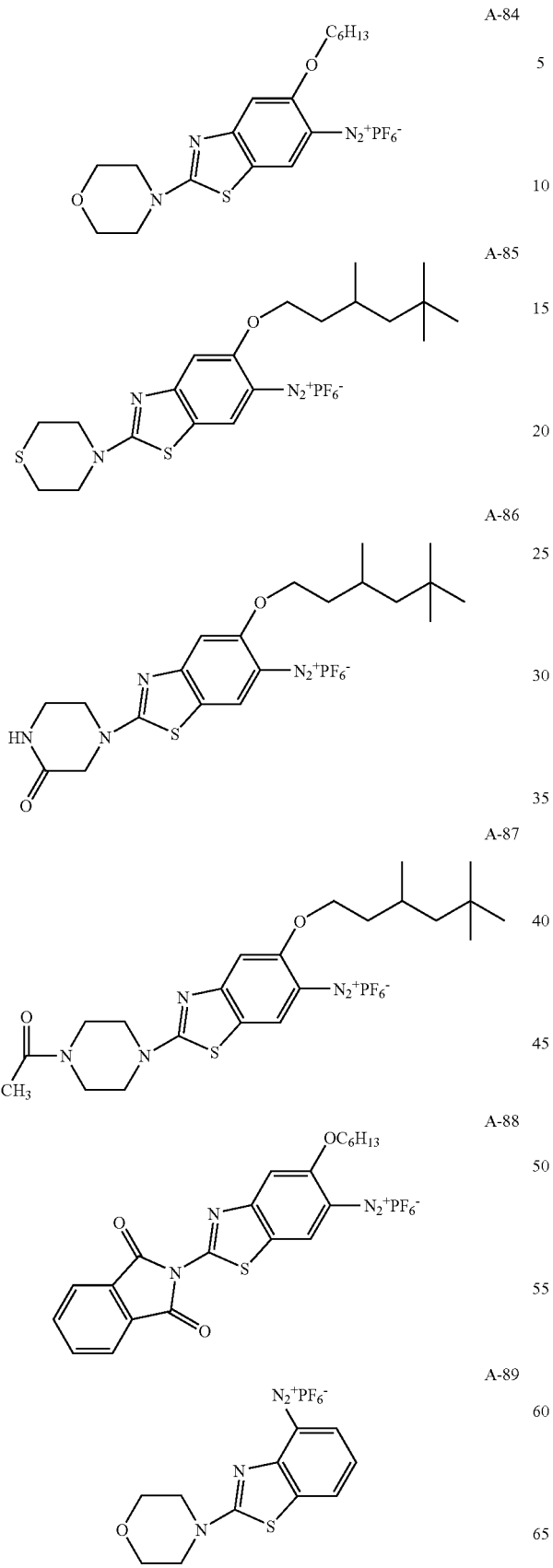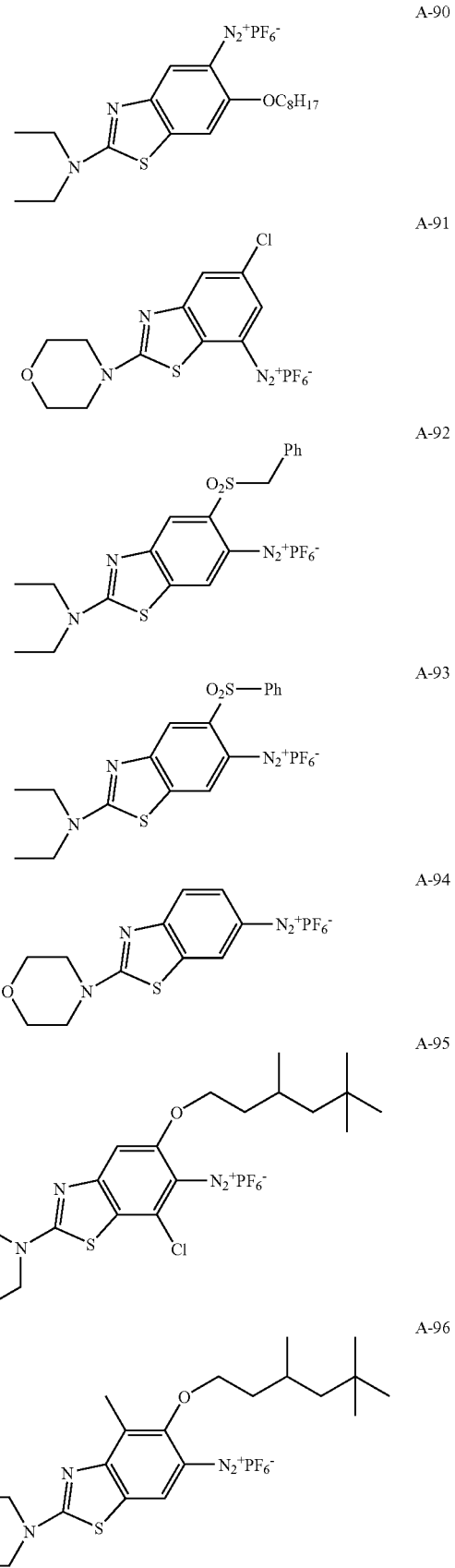

-continued

A-97 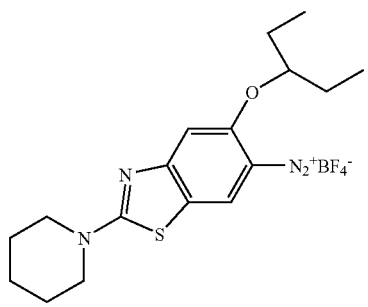

A-98 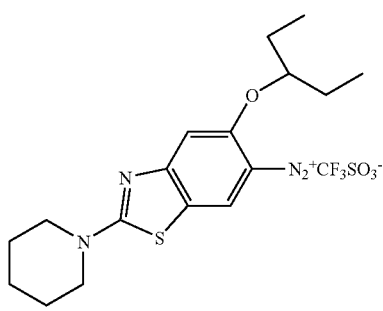

A-99 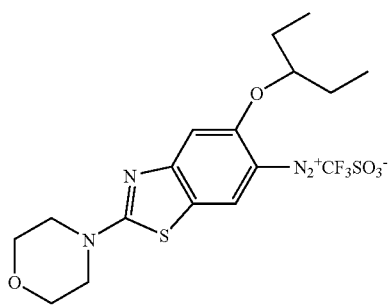

A-100 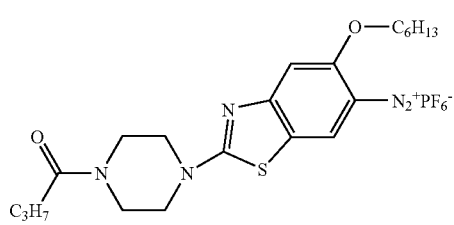

A-101 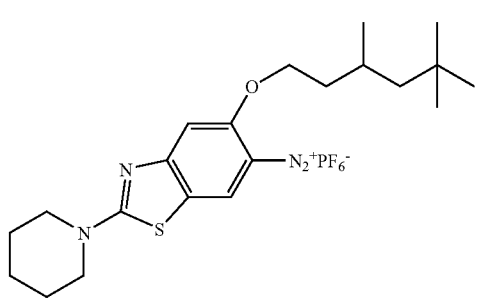

-continued

A-102 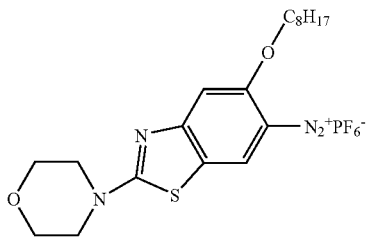

A-103 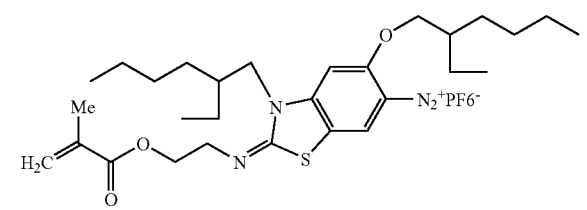

The diazonium salt used in the invention is heat-resistant. Therefore, heat-sensitive recording materials using the diazonium salt has an improved heat stability and raw storage stability. It is possible to stably form an image with high optical density regardless of the environmental conditions.

(Coupler Compound)

In an embodiment, the heat-sensitive recording layer includes a coupler compound (coupling component) which reacts with the diazonium salt to develop color when heated. The coupler compound is not particlarly limited as long as the coupler compound is capable of undergoing a rapid coupling reaction with the diazonium salt to form a colorant in a basic condition or in a neutral condition. The coupler compound can be suitably selected from such compounds as to develop a desired hue.

Examples of the coupler compound include resorcin, phloroglucine, sodium 2,3-dihydroxynaphthalene-6-sulfonate, sodium 2-hydroxy-3-naphthalene sulfonate, 2-hydroxy-3-naphthalene sulfonic acid anilide, 2-hydroxy-3-naphthalene sulfonic acid morpholinoamide, 2-hydroxy-3-naphthalene sulfonic acid morpholinopropylamide, 2-hydroxy-3-naphthalene sulfonic acid-2-ethylhexyloxypropylamide, 2-hydroxy-3-naphthalene sulfonic acid-2-ethylhexyamide, sodium 1-hydroxy-8-acetylaminonaphthalene-1,6-disulfonate, 1-hydroxy-8-acetylaminonaphthalene-8,6-disulfonic acid dianilide, 1-hydroxy-2-naphthoic acid morpholinopropylamide, 1,3-dihydroxy naphthalene, 2,2-dihydroxy naphthalene, 2,3-dihydroxy-6-naphthalene sulfonic acid anilide, 2-hydroxy-3-naphthoic acid morpholinopropylamide, 2-hydroxy-3-naphthoic acid anilide, 2-hydroxy-3-naphthoic acid-2'-methyl anilide, 2-hydroxy-3-naphthoic acid ethanol amide, 2-hydroxy-3-naphthoic acid octylamide, 2-hydroxy naphthoic acid morpholinoethylamide, 2-hydroxy naphthoic acid piperidinopropylamide, 2-hydroxy naphthoic acid piperidinoethylamide, 2-hydroxy-3-naphthoic acid-N-dodecyloxy-propylamide, 2-hydroxy-3-naphthoic acid tetradecylamide, 6-methoxy-2-hydroxy-3-naphthoic acid anilide, 6-ethoxy-2-hydroxy-3-naphthoic acid anilide, 6-methoxy-2-hydroxy-3-naphthoic acid morpholinopropylamide, 6-methoxy-2-hydroxy-3-naphthoic acid-2-hydroxyethylamide, acetoanilide, acetoacetoanilide, 2-chloro-3-(2,4-di-1-amylphenoxypropylaminocarbonyl)-pivaloyl acetoanilide, benzoylacetoanilide, 1-phenyl-3-methyl-5-pyrazolone, 1-(2',4',6'-trichlorophenyl)-3-benzamide-5-pyrazolone, 1-(2',4',6'-trichlorophenyl)-3-anilino-3-pyrazolone, and 1-phenyl-3-phenylacetamide-5-pyrazolone.

In the invention, only a single coupler may be used, or two or more couplers may be used. The content of the coupler in the heat-sensitive recording layer is preferably in the range of 0.1 to 30 parts by mass per 1 part by mass of the diazonium salt.

(Other Components)

Besides a combination of a diazonium salt and a coupler (diazo color developing system), a combination of an electron-donating dye precursor and an electron-receiving compound (leuco color developing system) can be used as the coloring component in the heat-sensitive recording material as described above. In an embodiment, the heat-sensitive recording material includes a plurality of heat-sensitive recording layers on a support, and at least one of the heat-sensitive recording layers includes the leuco color developing system.

Examples of the electron-donating dye precursor include triaryl methane compounds, diphenyl methane compounds, thiazine compounds, xanthene compounds, and spiropyran compounds. The triaryl methane compounds and xanthene compounds are preferable since they develop colors having high optical density.

Examples of the electron-donating dye precursor include 3,3-bis(p-dimethylaminophenyl)-6-dimethylaminophthalide (that is, crystal violet lactone), 3,3-bis(p-dimethylamino)phthalide, 3-(p-dimethylaminophenyl)-3-(1,3-dimethylindol-3-yl)phthalide, 3-(p-dimethylaminophenyl)-3-(2-methylindol-3-yl)phthalide, 3-(o-methyl-p-diethylaminophenyl)-3-(2-methylindol-3-yl)phthalide, 4,4'-bis(dimethylamino)benzhydrinbenzyl ether, N-halophenylleucoauramine, N-2,4,5-trichlorophenylleucoauramine, rhodamine-B-anilinolactam, rhodamine(p-nitroanilino)lactam, rhodamine-B-(p-chloroanilino)lactam, 2-benzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-anilino-3-methyl-6 isoamylethylaminofluoran, 2-(o-chloroanilino)-6-diethylaminofluoran, 2-octylamino-6-diethylaminofluoran, 2-ethoxyethylamino-3-chloro-2-diethylaminofluoran, 2-anilino-3-chloro-6-diethylaminofluoran, benzoyl leucomethylene blue, p-nitrobenzyl leucomethylene blue, 3-methyl-spiro-dinaphthopyran, 3-ethyl-spiro-dinaphthopyran, 3,3'-dichloro-spiro-dinaphthopyran, 3-benzylspirodinaphthopyran, and 3-propyl-spiro-dibenzopyran. The amount of the electron-donating dye precursor in the heat-sensitive recording layer is preferably 0.1 to 2 g/m².

The electron-receiving compound may be, for example, a phenol derivative, a salicylic acid derivative, or a hydroxybenzoic ester, preferably a bisphenol or a hydroxybenzoic ester.

Specific examples thereof include: 2,2-bis(p-hydroxyphenyl)propane (bisphenol A), 4,4-(p-phenylenediisopropylidene)diphenol (bisphenol P), 2,2-bis(p-hydroxyphenyl)pentane, 2,2-bis(p-hydroxyphenyl)ethane, 2,2-bis(p-hydroxyphenyl)butane, 2,2-bis(4'-hydroxy-3',5'-dichlorophenyl)propane, 1,1-(p-hydroxyphenyl)cyclohexane, 1,1-(p-hydroxyphenyl)propane, 1,1-(p-hydroxyphenyl)pentane, 1,1-(p-hydroxyphenyl)-2-ethylhexane, 3,5-di(α-methylbenzyl)salicylic acid and multivalent metal salts thereof, 3,5-di(tertbutyl)salicylic acid and multivalent metal salts thereof, 3-α,α-dimethylbenzyl-salicylic acid and multivalent metal salts thereof, butyl p-hydroxybenzoate, benzyl p-hydroxybenzoate, 2-ethylhexyl p-hydroxybenzoate, p-phenyl phenol, and p-cumyl phenol. The content of the electron-receiving compound in the heat-sensitive recording layer is preferably 0.1 to 30 parts by mass per 1 part by mass of the electron-donating dye precursor.

In an embodiment, an organic base is added to the heat-sensitive recording layer for the purpose of promoting the coupling reaction of the diazonium salt with the coupler. In the embodiment, the heat-sensitive recording layer includes the organic base, the diazonium salt, and the coupler. Only a single organic base may be used, or two or more organic bases may be used.

Examples of the organic base include nitrogen-containing compounds such as tertiary amines, piperidine and derivatives thereof, piperazine and derivatives thereof, amidine and derivatives thereof, formamidine and derivatives thereof, pyridine and derivatives thereof, guanidine and derivatives thereof, morpholine and derivatives thereof, organic bases described in JP-B No. 52-46806, JP-A Nos. 62-70082, 57-169745, 60-94381, 57-123086, 58-1347901, 60-49991, JP-B Nos. 2-24916, and 2-28479, JP-A Nos. 60-165288 and 57-185430. The disclosures of the above documents are incorporated herein by reference.

Specific examples of the organic base include: piperazine derivatives such as N,N'-bis(3-phenoxy-2-hydroxypropyl)piperazine, N,N'-bis[3-(p-methylphenoxy)-2-hydroxypropyl]piperazine, N,N'-bis[3-(p-methoxyphenoxy)-2-hydroxypropyl]piperazine, N,N'-bis(3-phenylthio-2-hydroxypropyl)piperazine, N,N'-bis[3-(β-naphthoxy)-2-hydroxypropyl]piperazine, N-3-(β-naphthoxy)-2-hydroxypropyl-N'-methylpiperazine, and 1,4-bis{[3-(N-methylpiperazino)-2-hydroxy]propyloxy}benzene; morpholine derivatives such as N-[3-(β-naphthoxy)-2-hydroxy]propyl morpholine, 1,4-bis(3-morpholino-2-hydroxypropyloxy)benzene and 1,3-bis(3-morpholino-2-hydroxypropyloxy)benzene; piperidine derivatives such as N-(3-phenoxy-2-hydroxypropyl)piperidine and N-dodecylpiperidine; and guanidine derivatives such as triphenyl guanidine, tricyclohexyl guanidine and dicyclohexyl phenyl guanidine. The content of the organic base in the heat sensitive recording layer is preferably 0.1 to 30 parts by mass part 1 part by mass of the diazonium salt.

In addition to the organic base described above, a sensitizer may also be added to the heat sensitive recording layer for the purpose of promoting the color development. The sensitizer is a substance which increases the optical density of the color developed by a thermal recording, or which lowers minimum temperature for color development. In an embodiment, the sensitizer lowers the melting point of the coupler, organic base, diazonium salt or the like. In another embodiment, the sensitizer lowers the softening temperature of the capsule wall thereby facilitating the reaction of the diazonium salt, organic base, coupler or the like.

The sensitizer is preferably a low-melting organic compound having an appropriate aromatic group and an appropriate polar group. Examples thereof include benzyl p-benzyloxybenzoate, α-naphthyl benzyl ether, β-naphthyl benzyl ether, phenyl β-naphthoate, phenyl α-hydroxy-β-naphthoate, β-naphthol-(p-chlorobenzyl)ether, 1,4-butanediol phenyl ether, 1,4-butanediol-p-methyl phenyl ether, 1,4-butanediol-p-ethyl phenyl ether, 1,4-butanediol-m-methyl phenyl ether, 1-phenoxy-2-(p-tolyloxy)ethane, 1-phenoxy-2-(p-ethylphenoxy)ethane, 1-phenoxy-2-(p-chlorophenoxy)ethane, and p-benzyl biphenyl.

The heat-sensitive recording layer may include a binder, and the binder may be selected from known water-soluble polymer compounds and latexes. Examples of the water-soluble polymer include methyl cellulose, carboxymethyl cellulose, hydroxyethyl cellulose, hydroxypropyl cellulose, starch derivatives, casein, gum arabic, gelatin, ethylene-maleic anhydride copolymers, styrene-maleic anhydride copolymers, polyvinyl alcohol, epichlorohydrin-modified polyamide, isobutylene-maleic anhydride copolymers, polyacrylic acid, polyacrylic acid amide, and modified products thereof. Examples of the latex include styrene-butadiene rubber latex, methyl acrylate-butadiene rubber latex, and vinyl acetate emulsion.

The heat-sensitive recording layer may include an antioxidant for the purpose of improving the light fastness and heat resistance of the developed color image or suppressing yellowing of non-printed regions (non-image region) caused by light after fixation.

Examples of the antioxidant include the antioxidants described in European Patent Laid-Open Nos. 223739, 309401, 309402, 310551, 310552 and 459416, German Patent Laid-Open No. 3435443, JP-A Nos. 54-48535, 62-262047, 63-113536, 63-163351, 2-262654, 2-71262, 3-121449, 5-61166, and 5-119449, and U.S. Pat. Nos. 4,814,262 and 4,980,275. The disclosures of the above documents are incorporated herein by reference.

In the invention, the forms of the coupler and other optional components such as the organic base and sensitizer in the coating liquid are not particularly limited. For example, each component can be used (1) in the form of a solid dispersion, (2) in the form of an emulsion, (3) in the form of a polymer dispersion, (4) in the form of a latex dispersion, or (5) being contained in a microcapsule.

(Heat Sensitive Recording Material)

The heat-sensitive recording material of the invention may be a single-color heat-sensitive recording material having one heat-sensitive recording layer on a support or a multicolor heat-sensitive recording material having a plurality of single-color heat-sensitive recording layers on a support.

In an embodiment, the heat-sensitive recording material is a full-color heat-sensitive recording material including three recording layers which develop cyan, yellow and magenta colors respectively, and each of the three recording layers on the support includes the diazo color developing system. In another embodiment, the heat-sensitive recording material is a full-color heat-sensitive recording material including three recording layers which develop cyan, yellow and magenta colors respectively, and the first recording layer nearest to the support includes the leuco color developing system utilizing a combination of an electron-donating dye and an electron-receiving compound, and each of the second and third recording layers includes the diazo coloration system. When the heat-sensitive recording material is a full-color heat-sensitive recording material including three recording layers which develop cyan, yellow and magenta colors respectively, the recording layers are preferably disposed on the support in the order of cyan, magenta, and yellow from the substrate. The recording layer which develops yellow is the most suitable layer for including a microcapsule containing the diazonium salt or the molten salt of the invention.

The heat-sensitive recording material of the invention may have the following constitution (a), (b), or (c):

(a) The recording material includes a support, a first recording layer A, a second recording layer B, and optionally, a light transmittance controlling layer and/or a protective layer. The recording layer A and recording layer B are disposed on the support in this order. The recording layer A is a photo-fixable recording layer including a diazonium salt having a maximum absorption wavelength of 365±40 nm and a coupler which reacts with the diazonium salt to develop color. The recording layer B is a photo-fixable recording layer including a diazonium salt having a maximum absorption wavelength of 420±40 nm and a coupler which reacts with the diazonium salt to develop color.

(b) The recording material includes a support, a first recording layer A', a second recording layer B', a third recording layer C', and optionally, a light transmittance controlling layer and/or a protective layer. The recording layer A', recording layer B', and recording layer C' are disposed on the support in this order. The recording layer A' includes an electron-donating dye and an electron-accepting compound. The recording layer B' is a photo-fixable recording layer including a diazonium salt having a maximum absorption wavelength of 365±40 nm and a coupler which reacts with the diazonium salt to develop color. The recording layer C' is a photo-fixable recording layer including a diazonium salt having a maximum absorption wavelength of 420±40 nm and a coupler which reacts with the diazonium salt to develop color.

(c) The recording material includes a support, a first recording layer A", a second recording layer B", a third recording layer C", and optionally, a light transmittance controlling layer and/or a protective layer. The recording layer A", recording layer B", and recording layer C" are disposed on the support in this order. The recording layer A" is a photo-fixable recording layer including a diazonium salt having a maximum absorption wavelength of 350 nm or shorter and a coupler which reacts with the diazonium salt to develop color. The recording layer B" is a photo-fixable recording layer including a diazonium salt having a maximum absorption wavelength of 380±40 nm and a coupler which reacts with the diazonium salt to develop color. The recording layer C" is a photo-fixable recording layer including a diazonium salt having a maximum absorption wavelength of 445±40 nm and a coupler which reacts with the diazonium salt to develop color.

The multicolor recording method is described below by reference to the above-mentioned (b) or (c).

First, the third recording layer (layer C' or C") is heated and the reaction occurs between the diazonium salt and the coupler in the layer to develop color. Then, the layer is irradiated with a light having an emission central wavelength of 445±30 nm, whereby the unreacted diazonium salt in the layer C' or C" is decomposed and photo-fixed. Then, the second recording layer (layer B' or B") is heated to a sufficient degree for the color development in the second recording layer and the reaction occurs between the diazonium salt and the coupler in the layer to develop color. When the second layer is heated, the third recording layer (C' or C") is also strongly heated. However, a further color developing reaction does not occur in the third recording layer because the diazonium salt in the third layer has already been decomposed (photo-fixed) and the layer has lost its ability to develop color. The second layer is irradiated with a light having an emission central wavelength of 380±20 nm, whereby the unreacted diazonium salt contained in the layer B is decomposed and photo-fixed. Finally, the first recording layer (layer A' or A") is heated to a sufficient degree for the color development in the first recording layer, and the first recording layer develops color. When the first recording layer is heated, the second and third recording layers are also strongly heated. However, the second and third layers do not develop color since their ability to develop color has been lost by the decomposition of the diazonium salts.

When all the recording layers (first, second, and third recording layers) are diazo-based recording layers, each of the second and third recording layers have to be photo-fixed after the color development. However, photo-fixation of the first layer, which is subjected to image recording last, is not essential.

The light source used for the photo-fixation may be selected suitably from known light sources such as various fluorescent lamps, xenon lamps, mercury lamps, and LED. It is preferable for the light source to have a light emission spectrum which almost completely overlaps the absorption spectrum of diazonium chloride used in the recording material, in order to improve the efficiency of the photo-fixation.

(Other Layers)

In an embodiment, the heat-sensitive recording material of the invention include, on a support, a heat-sensitive recording layer and other layers such as a light transmittance controlling layer and a protective layer. As described above, there may be two or more heat-sensitive recording layers.

The light transmittance controlling layer includes an UV absorber precursor. The precursor does not have a UV absorbing function before irradiated with a light having a wavelength necessary for the fixation. Therefore, transmittance of this layer is high. At the fixation of the photo-fixable heat-sensitive recording layer, this layer sufficiently transmits the light having a wavelength necessary for fixation. The precursor does not inhibit the fixation of the heat-sensitive recording layer since the precursor has a high transmittance of visible rays. This UV absorber precursor may be contained preferably in the microcapsule. The light transmittance controlling layer may include compounds selected from the compounds described in JP-A No. 9-1928, the disclosure of which is incorporated by reference herein.

After the heat-sensitive recording layer is irradiated with a light of wavelength necessary for the fixation, the UV absorber precursor is converted to a UV absorber by light or heat. The UV absorber absorbs a large proportion of UV lights having wavelengths necessary for the fixation, thus lowering the transmittance for the UV lights and improving the light fastness of the heat-sensitive recording material. However, the UV absorber does not absorb visible rays. Accordingly, the transmittance for visible rays is not reduced substantially.

At least one light transmittance controlling layer may be provided in the heat-sensitive recording material. In an embodiment, the heat-sensitive recording material has the light transmittance controlling layer(s) between the heat-sensitive recording layer and the outermost protective layer. In another embodiment, the protective layer may serve as a light transmittance controlling layer. The characteristics of the light transmittance controlling layer may be selected arbitrarily in accordance with the characteristics of the heat-sensitive recording layer.

A coating liquid for forming the light transmittance controlling layer (coating liquid for the light transmittance controlling layer) is obtained by mixing the respective components described above. The coating liquid may be applied by a known coating method such as the bar coating, the air knife coating, the blade coating, or the curtain coating to form a light transmittance controlling layer. In an embodiment, the light transmittance controlling layer is coated simultaneously with the heat-sensitive recording layer or the like. In another embodiment, the coating liquid for forming the heat-sensitive recording layer is applied and dried, then the coating liquid for the light transmittance controlling layer is coated thereon. The amount of the light transmittance controlling layer after drying is preferably 0.8 to 4.0 $g/m^2$.

The protective layer includes a binder and other components such as pigments, lubricants, surfactants, dispersants, fluorescent brighteners, metal soaps, hardening agents, UV absorbers, and crosslinking agents.

The binder may be selected from binders which does not impair the barrier function and workability. Examples of the binder include polyvinyl alcohol, methyl cellulose, carboxymethyl cellulose, hydroxyethyl cellulose, starch, gelatin, gum arabic, casein, a styrene-maleic acid copolymer hydrolysate, an ethylene-maleic anhydride copolymer hydrolysate, an isobutylene-maleic anhydride copolymer hydrolysate, polyvinyl alcohol, modified polyvinyl alcohol, polyacrylamide, synthetic rubber latexes, and synthetic resin emulsions. Examples of the synthetic rubber latexes, and synthetic resin emulsions include styrene-butadiene rubber latex, acrylonitrile-butadiene rubber latex, methyl acrylate-butadiene rubber latex, and vinyl acetate emulsion. The content of the binder is preferably 10 to 500% by mass, more preferably 50 to 400% by mass, based on the amount of the pigment in the protective layer.

In an embodiment, a crosslinking agent and a catalyst promoting the reaction are further included in the protective layer in order to further improve the water resistance. Examples of the crosslinking agent include epoxy compounds, blocked isocyanates, vinylsulfone compounds, aldehyde compounds, methylol compounds, boric acid, carboxylic anhydrides, silane compounds, chelate compounds and halides. The crosslinking agent is preferably such a compound that the pH of the coating liquid for forming the protective layer can be adjusted to 6.0 to 7.5. Examples of the catalyst include known acids and metal salts. The catalyst is preferably such a compound that the pH of the coating liquid for forming the protective layer can be adjusted to 6.0 to 7.5.

The pigment in the protective layer may be any known organic or inorganic pigment. Examples thereof include calcium carbonate, aluminum hydroxide, barium sulfate, titanium oxide, talc, agalmatolite, kaolin, calcined kaolin, amorphous silica, colloidal silica, urine-formalin resin powder, polyethylene resin powder, and benzoguanamine resin powder. The protective layer may include only a single pigment, or may include two or more pigments.

The lubricant may be, for example, zinc stearate, calcium stearate, paraffin wax or polyethylene wax.

The surfactant is used for the formation of a uniform protective layer on the heat-sensitive recording layer. The surfactant may be, for example, an alkali metal sulfosuccinate, or a fluorine-containing surfactant. Examples of the surfactant include sodium di-(2-ethylhexyl)sulfosuccinate, ammonium di-(2-ethylhexyl)sulfosuccinate, sodium di-(n-hexyl)sulfosuccinate, and ammonium di-(n-hexyl)sulfosuccinate.

The coating liquid for forming the protective layer (coating liquid for the protective layer) is obtained by mixing the respective components described above, and may be blended with other substances such as a release agent, a wax, and a water repellant in accordance with the necessity.

The heat-sensitive recording material of the invention can be formed by applying the protective layer coating liquid onto the heat-sensitive recording layer on the support by a known coating method. The known coating method may be a method using a bar coater, an air knife coater, a blade coater, or a curtain coater. The protective layer may be coated simultaneously with the heat recording layer and/or the light transmittance regulating layer. In an embodiment, the coating liquid for forming the heat-sensitive recording layer is applied and dried, then the protective layer is coated thereon.

The coating amount of the protective layer after drying is preferably 0.2 to 7 g/m², more preferably 1 to 4 g/m². When the coating amount after drying is 0.2 to 7 g/m², the water resistance and thermal sensitivity are excellent. After coating and formation of the protective layer, the layer may be subjected to calendering if necessary.

When there are two or more heat-sensitive recording layers, an intermediate layer is preferably provided between the respective recording layers. Similarly to the protective layer described above, the intermediate layer may include a pigment, a lubricant, a surfactant, a dispersant, a fluorescent brightener, a metal soap or a UV absorber in addition to a binder. The scope and examples of the usable binder are the same as in the explanation of the protective layer.

(Support)

The support may be, for example, polyethylene terephthalate (PET), polyethylene naphthalate (PEN), triacetyl cellulose (TAC), paper, plastic resin laminate paper, or synthetic paper. In order to obtain a transparent heat-sensitive recording material, the support has to be transparent. Examples of the transparent support include polyester films such as polyethylene terephthalate and polybutylene terephthalate, triacetate cellulose films, and synthetic polymer films such as polyolefin film (such as polypropylene and polyethylene).

A single material may be used as the support, or a lamination of two or more materials may be used as the support. The thickness of the synthetic polymer film is preferably 25 to 300 µm, more preferably 100 to 250 µm.

The synthetic polymer film may be colored so as to have an arbitrary hue. The polymer film may be colored by: a method comprising kneading a dye with a resin and forming the kneaded mixture into a film; or a method comprising preparing a coating liquid including a dye dissolved in a suitable solvent, applying the coating liquid onto a transparent and colorless resin film by a known coating method such as a gravure coating method, a roller coating method or a wire coating method, and drying the coating liquid. In an embodiment, the film is obtained by: kneading a blue dye with a polyester resin such as polyethylene terephthalate or polyethylene naphthalate, forming it into a film, and subjecting the film to a heat-resistance imparting treatment, stretching treatment and antistatic treatment.

The heat-sensitive recording layer (recording layer), the protective layer, the light transmittance controlling layer, the intermediate layer and the like can be formed by coating a support with the coating liquids for forming the respective layers by a known coating method such as a blade coating method, an air knife coating method, a gravure coating method, a roll coating method, a spray coating method, a dip coating method or a bar coating method, followed by drying of the coating liquid.

EXAMPLES

Hereinafter, the present invention is described in more detail with reference to the examples. However, the examples should not be construed as limiting the invention. In the examples, the terms "parts" and "%" refer to "parts by mass" and "% by mass" respectively unless specified otherwise.

Example 1

(Preparation of an Aqueous Solution of Phthalated Gelatin)

32 parts of phthalated gelatin (trade name: "#801 Gelatin" manufactured by Nitta Gelatin Inc.), 0.9143 part of 1,2-benzothiazolin-3-one (3.5% methanol solution, manufactured by Daito Chemical Industries, Ltd.) and 367.1 parts of deionized water were mixed and dissolved at 40° C. to give an aqueous solution of phthalated gelatin.

(Preparation of a Diazonium Salt Solution)

2.8 parts of the following diazonium salt compound (A) having a maximum absorption wavelength for degradation of 365 nm, 4.16 parts of trimethylol propane triacrylate (trade name: "LIGHT ESTER TMP", manufactured by Kyoeisha Chemical Co., Ltd.) as a high-boiling solvent, 7.76 parts of diphenyl phthalate, and 0.08 part of calcium dodecylbenzenesulfonate (PIONINE A41-C manufactured by Takemoto Oil & Fat Co., Ltd., 70% methanol solution) were added to 15.0 parts by mass of ethyl acetate, and the liquid was heated and uniformly mixed to give a diazonium salt solution.

Diazonium salt compound (A)

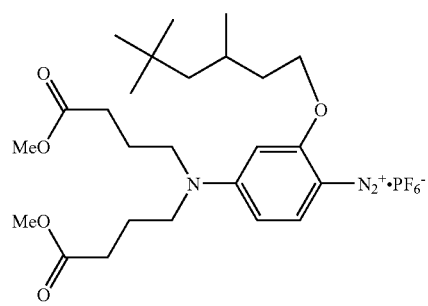

(Preparation of a Capsule Wall Solution)

7.5 parts of ethyl acetate was uniformly mixed with 6.80 parts of a xylylene diisocyanate-trimethylol propane additive (trade name: "TAKENATE D110N" manufactured by Mitsui Takeda Chemical, 75% ethyl acetate solution) and 2.48 parts of a mixture of a xylylene diisocyanate-trimethylol propane additive and a xylylene diisocyanate-bisphenol A adduct (trade name: "TAKENATE D119N" manufactured by Mitsui Takeda Chemical, 50% ethyl acetate solution) as capsule wall components to give a capsule wall solution.

(Preparation of an Aqueous Phase Solution)

21.0 parts of deionized water and 1.12 parts of sodium dodecylbenzenesulfonate ("NEOPELLEX G15" manufactured by Kao Corporation, 15% aqueous solution) were added to, and uniformly mixed with, 55.0 parts of the aqueous solution of phthalated gelatin to give an aqueous phase solution.

16.78 parts of the capsule wall solution was added to 77.12 parts of the aqueous phase solution and emulsified at a temperature of 40° C. for 10 minutes by a homogenizer manufactured by Nippon Seiki Seisakusho Co., Ltd. 29.8 parts of the diazonium salt solution was added to the resulting emulsion and the mixture was emulsified and dispersed again at a 40° C. for 10 minutes by the homogenizer. Thereafter, 30 parts of water was added to the emulsion, and the mixture was made uniform and subjected to capsulation reaction at a temperature of 40° C. under stirring for 3 hours. Thereafter, the liquid temperature was lowered to 35° C., and 6.5 parts of ion-exchange resin "AMBERLITE IRA68" (manufactured by Organo Corporation) and 13 parts of "AMBERLITE IRC50" (manufactured by Organo Corporation) were added thereto and the liquid was stirred for 1 hour. Then, the ion-exchange resin was removed by filtration, and the concentration of the filtrate was controlled such that the solids content of the microcapsule liquid became 18%. In this way, a desired microcapsule liquid was obtained in which the microcapsules contain the diazonium salt. The particle diameter of the microcapsules was 0.445 μm in terms of the medium diameter when measured by a particle size distribution measuring instrument LA-700 manufactured by Horiba, Ltd. The particle size distribution was narrow with one frequency peak, and the particle sizes are distributed within a range of 0.06 to 2.27 μm.

Example 2

29.8 parts of the diazonium salt solution of Example 1 was added to 77.2 parts of the aqueous phase solution of Example 1, and the mixture was emulsified at 40° C. for 10 minutes by a homogenizer manufactured by Nippon Seiki Seisakusho Co., Ltd. 16.78 parts of the capsule wall solution of Example 1 was added to the resulting emulsion and the mixture was then emulsified again at 40° C. for 10 minutes by the homogenizer. Thereafter, 30 parts of water was added to the emulsion, and the mixture was made uniform and subjected to capsulation reaction at a temperature of 40° C. under stirring for 3 hours. Thereafter, the liquid temperature was lowered to 35° C., and 6.5 parts of ion-exchange resin "AMBERLITE IRA68" (manufactured by Organo Corporation) and 13 parts of "AMBERLITE IRC50" (manufactured by Organo Corporation) were added thereto and the liquid was stirred for 1 hour. Then, the ion-exchange resin was removed by filtration, and the concentration of the filtrate was controlled such that the solids content of the microcapsule liquid became 18%. In this way, a desired microcapsule liquid was obtained in which the microcapsules contain the diazonium salt. The particle diameter of the microcapsules was 0.420 μm in terms of the medium diameter when measured by a particle size distribution measuring instrument LA-700 manufactured by Horiba, Ltd. The particle size distribution was narrow with one frequency peak, and the particle sizes are distributed within a range of 0.06 to 2.27 μm.

Example 3

29.8 parts of the diazonium salt solution of Example 1 was added to 38.56 parts of the aqueous phase solution of Example 1 and the mixture was emulsified at 40° C. for 10 minutes by a homogenizer manufactured by Nippon Seiki Seisakusho Co., Ltd. Separately, 16.78 parts of the capsule wall solution of Example 1 was added to 38.56 parts of the aqueous phase solution of Example 1 and the mixture was emulsified at 40° C. for 10 minutes by the homogenizer. The two emulsions were combined and emulsified at 40° C. for 10 minutes by the homogenizer. Thereafter, 30 parts of water was added to the emulsion, and the mixture was made uniform and subjected to capsulation reaction at a temperature of 40° C. under stirring for 3 hours. Thereafter, the liquid temperature was lowered to 35° C., and 6.5 parts of ion-exchange resin "AMBERLITE IRA68" (manufactured by Organo Corporation) and 13 parts of "AMBERLITE IRC50" (manufactured by Organo Corporation) were added thereto and the liquid was stirred for 1 hour. Then, the ion-exchange resin was removed by filtration, and the concentration of the filtrate was controlled such that the solids content of the microcapsule liquid became 18%. In this way, a desired microcapsule liquid was obtained in which the microcapsules contain the diazonium salt. The particle diameter of the microcapsules was 0.421 μm in terms of the medium diameter when measured by a particle size distribution measuring instrument LA-700 manufactured by Horiba, Ltd. The particle size distribution was narrow with one frequency peak, and the particle sizes are distributed within a range of 0.06 to 2.27 μm.

Comparative Example 1

7.5 parts of ethyl acetate was uniformly mixed with 29.8 parts of the diazonium salt solution of Example 1, 6.80 parts of a xylylene diisocyanate-trimethylol propane additive (trade name: "TAKENATE D110N" manufactured by Mitsui Takeda Chemical, 75% ethyl acetate solution) as a capsule wall component, and 2.48 parts of a mixture of a xylylene diisocyanate-trimethylol propane additive and a xylylene diisocyanate-bisphenol A adduct (trade name: "TAKENATE D119N" manufactured by Mitsui Takeda Chemical, 50% ethyl acetate solution) as a capsule wall component to give an oil phase mixture (A).

Separately, 21.0 parts of deionized water and 1.12 parts of sodium dodecylbenzenesulfonate ("NEOPELLEX G15" manufactured by Kao Corporation, 15% aqueous solution) were added to, and uniformly mixed with, 55.0 parts of the aqueous phthalated gelatin solution of Example 1 to give an aqueous phase solution.

46.58 parts of the above oil phase mixture (A) was added to 77.12 parts of the above aqueous phase solution and the mixture was emulsified at 40° C. for 20 minutes by the homogenizer. Thereafter, 30 parts of water were added to the emulsion, and the mixture was made uniform and subjected to capsulation reaction at a temperature of 40° C. under stirring for 3 hours. Thereafter, the liquid temperature was lowered to 35° C., and 6.5 parts of ion-exchange resin "AMBERLITE IRA68" (manufactured by Organo Corporation) and 13 parts of "AMBERLITE IRC50" (manufactured by Organo Corporation) were added thereto and the liquid was stirred for 1 hour. Then, the ion-exchange resin was removed by filtration, and the concentration of the filtrate was controlled such that the solids content of the microcapsule liquid became 18%. In this way, a desired microcapsule liquid was obtained in which the microcapsules contain the diazonium salt. The particle diameter of the microcapsules was 0.917 μm in terms of the medium diameter when measured by a particle size distribution measuring instrument LA-700 manufactured by Horiba, Ltd. The particle size distribution was broad with two frequency peaks, and the particle sizes are distributed within a range of 0.06 to 4.47 μm.

The microcapsule liquids obtained in Examples 1 to 3 and Comparative Example 1 were used for preparation of heat-sensitive recording materials which can develop magenta, and heat-sensitive performance thereof was evaluated.

(Preparation of an Alkali-treated Gelatin Solution)

25.5 parts of alkali-treated low-ion gelatin (trade name: "#750 GELATIN", manufactured by Nitta Gelatin Inc.), 0.5 part of 1,2-benzothiazolin-3-one (manufactured by Daito Chemical Industries, Ltd., 3.5% methanol solution), 0.153 part of calcium hydroxide and 143.85 parts of deionized water were mixed and the components therein were dissolved at 50° C. to give an aqueous gelatin solution for the preparation of an emulsion.

(Preparation of a Coupler Emulsion (b))

6.3 parts of the following coupler compound (E), 14.0 parts of triphenyl guanidine (manufactured by Hodogaya Chemical Co., Ltd.), 16.0 parts of 4,4'-(m-phenylenediisopropylidene)diphenol (trade name: "BISPHENOL M" manufactured by Mitsui Petrochemical Industries, Ltd.), 12 parts of 1,1'-(p-hydroxyphenyl)-2-ethylhexane, 3.5 parts of 3,3,3',3'-tetramethyl-5,5',6,6'-tetra(1-propyloxy)-1,1'-spirobisindane, 3.5 parts of the following compound (G), 1.7 parts of tricresyl phosphate, 0.8 part of diethyl maleate, and 4.5 parts of calcium dodecylbenzenesulfonate (trade name: "PIONINE A-41-C" manufactured by Takemoto Oil & Fat Co., Ltd., 70% methanol solution) were dissolved in 36.9 parts of ethyl acetate to give a mixture (VII).

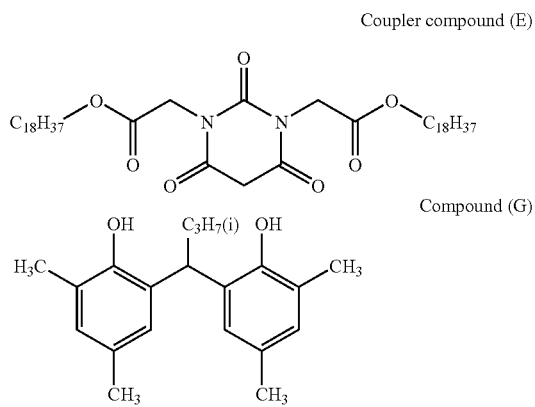

Coupler compound (E)

Compound (G)

Separately, 107.3 parts of deionized water was mixed with 206.3 parts of the aqueous alkali-treated gelatin solution obtained above to give a mixture (VIII).

The mixture (VII) was added to the mixture (VIII), and the resultant mixture was emulsified at 40° C. by a homogenizer manufactured by Nippon Seiki Seisakusho Co., Ltd. The resulting coupler emulsion was heated under reduced pressure to remove the ethyl acetate, and the solids content of the emulsion was adjusted to 24.5% to give a coupler emulsion (b). The particle diameter of the resulting coupler emulsion (b) was 0.22 µm in terms of medium diameter, when measured by a particle size distribution measuring instrument LA-700 manufactured by Horiba, Ltd.

(Preparation of a Coating Liquid for Magenta Heat-sensitive Recording Layer)

Each of the microcapsule liquids of Examples 1 to 3 and Comparative Example 1 was mixed with the coupler emulsion (b) in such a ratio that the ratio by mass of (the coupler compound/the diazonium salt) was 2.0/1. Then, 0.2 part of 5% aqueous solution of polystyrene sulfonic acid (partially neutralized with potassium hydroxide) was mixed with 10 parts of the above mixture including the microcapsules to give a coating liquid for magenta heat-sensitive recording layer for each of Examples 1 to 3 and Comparative Example 1.

(Preparation of a Protective Layer Coating Liquid)

(1) Preparation of a PVA Solution for Protective Layer 160 parts of a vinyl alcohol (PVA)-alkyl vinyl ether copolymer (trade name: EP-130 manufactured by Denki Kagaku Kogyo Kabushiki Kaisha), 8.74 parts of a mixture of sodium alkyl sulfonate and polyoxyethylene alkyl ether phosphate (trade name: NEOSCORE CM-57 (54% aqueous solution), manufactured by Toho Chemical Industry Co., Ltd.) and 3832 parts of deionized water were mixed, the components therein were dissolved at 90° C. for 1 hour, so that the solution is made uniform. In this way, a PVA solution for a protective layer was prepared.

(2) Preparation of a Pigment Dispersion Liquid for a Protective Layer 0.2 part of anionic special polycarboxylic acid-based polymer activator (trade name: "POISE 532A" manufactured by Kao Corporation, 40% aqueous solution) and 11.8 parts of deionized water were mixed with 8 parts of barium sulfate (trade name: "BF-21F" manufactured by Sakai Chemical Industry Co., Ltd., having a content of barium sulfate of 93% or higher), and the mixture was dispersed by DYNOMILL to give a barium sulfate dispersion liquid. The particle diameter of the particles in the resulting dispersion liquid was 0.15 µm or less in terms of medium diameter, when measured by a particle size distribution measuring instrument LA-700 manufactured by Horiba, Ltd.

8.1 parts of colloidal silica (trade name: "SNOWTEX O" manufactured by Nissan Chemical Industries, Ltd., 20% aqueous dispersion liquid) was added to 45.6 parts of the resulting barium sulfate dispersion liquid, to give a pigment dispersion liquid for a protective layer.

(3) Preparation of a Matting Agent Dispersion Liquid for a Protective Layer 3.81 parts of an aqueous dispersion liquid of 1,2-benzoisothiazolin-3-one (trade name: "PROXEL B. D", manufactured by ICI Americas Inc.) and 1976.19 parts of deionized water were mixed uniformly with 220 parts of wheat starch (trade name: "Komugi Denpun S" manufactured by Shinshin Shokuhin Kogyo Co., Ltd.), to give a matting agent dispersion for a protective layer.

(4) Preparation of a Protective Layer Coating Liquid 40 parts of a fluorine-based surfactant (trade name: "MEGAFACK F-120" manufactured by Dainippon Ink and Chemicals, Incorporated, 5% aqueous solution), 50 parts of sodium (4-nonylphenoxytrioxyethylene)butylsulfonate (manufactured by Sankyo Chemical Industries, Ltd., 2.0% aqueous solution), 49.87 parts of the pigment dispersion liquid for a protective layer, 16.65 parts of the matting agent dispersion liquid for a protective layer, 48.7 parts of a zinc stearate dispersion liquid (trade name: "Highdoline F115", manufactured by Chukyo Oil & Fat Co., Ltd., 20.5% aqueous solution) and 280 parts of deionized water were uniformly mixed with 1000 parts of the PVA solution for a protective layer, to give a protective layer coating liquid.

(Preparation of a Support having an Undercoat Layer)

(1) Preparation of an Undercoat Layer Coating Liquid 40 parts of enzymatically decomposed gelatin (average molecular weight 10000, viscosity by PAGI method=15 mP, jelly strength by PAGI method=20 g) was added to, and dissolved in, 60 parts of deionized water at 40° C. under stirring to give an aqueous gelatin solution for an undercoat layer coating liquid.

Separately, 8 parts of water-swelling synthetic mica (trade name: "SOMASHIF ME100" with an aspect ratio of 1000, manufactured by Co-op Chemical Co., Ltd.) was mixed with 92 parts of water and then wet-dispersed by a visco-mill to give a mica dispersion liquid having an average particle diameter of 2.0 µm. Water was added to, and uniformly mixed with, the mica dispersion liquid to give a mica dispersion liquid having a mica concentration of 5%.

The temperature of the aqueous gelatin solution for an undercoat layer coating liquid was adjusted to 40° C. and the concentration thereof was adjusted to 40%. 120 parts of water and 556 parts of methanol were added to 100 parts of the aqueous gelatin solution. The mixture was sufficiently stirred, and then 208 parts of the mica dispersion liquid having a concentration of 5% was added thereto, and stirred sufficiently. Then, 9.8 parts of a 1.66% aqueous solution of polyethylene oxide-based surfactant was added thereto. Then, the liquid temperature was kept at 35 to 40° C., and 7.3 parts of a gelatin hardening agent consisting of an epoxy compound was added thereto to give an undercoat layer coating liquid (solid concentration, 5.7%).

(2) Preparation of a Support having an Undercoat Layer

Wood pulp composed of 50 parts of LBPS and 50 parts of LBPK was beaten with a disk type refiner to a Canadian freeness of 300 cc, and 0.5 part of epoxylated behenic amide, 1.0 part of anion polyacrylamide, 1.0 part of aluminum sulfate, 0.1 part of polyamide polyamine epichlorohydrin and 0.5 part of cation polyacrylamide were added to the pulp to prepare a base paper having a weight of 114 g/m² with a wire paper machine, and then calendered such that the thickness was 100 μm. The amounts of the above components are expressed in terms of the ratios of their absolute dry masses to the mass of the pulp.

Subsequently, both sides of the resulting base paper were subjected to corona discharge treatments, and then one of the sides was coated with polyethylene resin having a thickness of 36 μm by a melt extrusion machine, to form a resin layer having a matted surface (hereinafter, this side is occasionally referred to as "rear side"). Then, the surface on the opposite side to the resin layer was coated, by a melt extrusion machine, with polyethylene including 10% of anatase type titanium dioxide and a slight amount of ultramarine to a thickness of 50 μm to form a highly glossy resin layer (hereinafter, this side is occasionally referred to as "front side").

The surface of the resin layer on the rear side was subjected to a corona discharge treatment. 1 part of aluminum oxide (trade name: "ALUMINA SOL 100", manufactured by Nissan Chemical Industries, Ltd.) and 2 parts of silicon dioxide (trade name: "SNOWTEX O", manufactured by Nissan Chemical Industries, Ltd.) as antistatic agents were dispersed in water. The obtained dispersion was coated on the surface of the resin layer on the rear side in an amount of 0.2 g/m² in terms of the dry mass.

Subsequently, the surface of the polyethylene resin layer on the front side was subjected to a corona discharge treatment, and then coated with the undercoat layer coating liquid such that the coating amount of the mica was 0.26 g/m². The coating liquid was dried, thus a support having an undercoat layer was obtained.

(Preparation of a Heat-sensitive Recording Material)

The surface of the undercoat layer was simultaneously coated with the magenta heat-sensitive recording layer coating liquid and the protective layer coating liquid, and dried under drying conditions of 30° C., 30% RH and 40° C., 30% RH. The magenta heat-sensitive recording layer was positioned in-between the undercoat layer and the protective layer. In this way, heat-sensitive recording materials of Example 1 to 3 and Comparative Example 1 were prepared.

In the above procedure, the magenta heat-sensitive recording layer coating liquid was applied such that the coating amount of the diazonium salt (D) was 0.225 g/m², and the protective layer coating liquid was applied such that the coating amount in terms of solids content was 1.39 g/m².

(Evaluation of Color Development)

Each of the heat-sensitive recording materials of the Examples and Comparative Example was subjected to a thermal printing with a thermal head KST (manufactured by Kyocera Corporation) wherein the applied voltage and pulse width were selected such that the recording energy per unit area was 30 mJ/mm², and then the surface of the heat-sensitive recording layer was irradiated for 15 seconds with UV rays from a UV lamp having an emission central wavelength of 450 nm and a power output of 40 W and then further irradiated for 15 seconds with UV rays from a UV lamp having an emission central wavelength of 365 nm and a power output of 40 W to give an image. Separately, each of the heat-sensitive recording materials was subjected to a thermal printing with the thermal head wherein the applied voltage and pulse width were selected such that the recording energy per unit area was 50 mJ/mm², then the surface of the heat-sensitive recording layer was irradiated for 20 seconds with UV rays from a UV lamp having an emission central wavelength of 365 nm and a power output of 40 W to give an image.

Using Macbeth reflective densitometer RD918 manufactured by Macbeth, the maximum optical density of the developed M (magenta) color in the image printed with a recording energy of 30 mJ and the maximum optical density of the developed M (magenta) color in the image printed with a recording energy of 50 mJ were measured respectively. The measurement results are shown in Table 1 below.

TABLE 1

| | Capsule particle | Number of peaks in | Optical density of the developed color ($D_{max}$) | |
| --- | --- | --- | --- | --- |
| | diameter (μm) | particle diameter distribution ($D_{max}$) | Printing with 30 mJ | Printing with 50 mJ |
| Example 1 | 0.445 | 1 | 0.63 | 2.13 |
| Example 2 | 0.420 | 1 | 0.68 | 2.12 |
| Example 3 | 0.421 | 1 | 0.65 | 2.10 |
| Comparative Example 1 | 0.917 | 2 | 0.58 | 2.05 |

As is clear from the Examples and Comparative Example, the average particle sizes of the microcapsules (Examples 1 to 3) produced by the method of the invention were smaller than the average particle size of the microcapsules (Comparative Example 1) produce by the conventional method. The microcapsule liquids produced by the invention were excellent in dispersion stability and had a sharp particle diameter distribution. The heat-sensitive recording materials (Examples 1 to 3) produced by using the microcapsule liquids were superior to the heat-sensitive recording material of the Comparative Example in respect of the thermal sensitivity (γ) and density of the developed color.

Example 4

(Preparation of an Aqueous Phthalated Gelatin Solution)

32 parts of phthalated gelatin (trade name: "MGP GELATIN" manufactured by Nippi Collagen Co., Ltd.), 0.914 part of 1,2-benzothiazolin-3-one (3.5% methanol solution, manufactured by Daito Chemical Industries, Ltd.) and 367.1 parts of deionized water were mixed and the phthalated gelatin was dissolved at a temperature of 40° C. to give an aqueous phthalated gelatin solution.

(Preparation of an Aqueous Alkali-treated Gelatin Solution)

25.5 parts of alkali-treated low-ion gelatin (trade name: "#750 Gelatin", manufactured by Nitta Gelatin Inc.), 0.729 part of 1,2-benzothiazolin-3-one (3.5% methanol solution, manufactured by Daito Chemical Industries, Ltd.), 0.153 part of calcium hydroxide and 143.6 parts of deionized water were mixed and the gelatin was dissolved at a temperature of 50° C. to give an aqueous alkali-treated gelatin solution for the preparation of an emulsion.

(Preparation of a Microcapsule Liquid Including Microcapsules Containing a Diazonium Salt)

(1) Preparation of a Capsule Wall Material-containing Solution 14.7 parts of monoisopropyl biphenyl and 14.7 parts of diphenyl phthalate were added to and dissolved in 56 parts of ethyl acetate. 17.76 parts of a xylylene diisocyanate-trimethylol propane additive (trade name: "TAKENATE D110N" manufactured by Mitsui Takeda Chemical, 75% ethyl acetate solution) as a capsule wall material was uniformly mixed with the above mixture. In this way, a capsule wall material-containing mixture (Ia) was obtained.

(2) Preparation of an Aqueous Phase Solution

Separately, 49.78 parts of deionized water and 1.05 parts of "SCRAPH AG-8" (manufactured by Nippon Fine Chemical Co., Ltd., 50% aqueous solution) were added to, and mixed uniformly with, 179.03 parts of the aqueous phthalated gelatin solution to give an aqueous phase mixture (IIa).

(3) Preparation of a Capsule Wall Material-containing Emulsion

The mixture (Ia) was added to the mixture (IIa) and the mixture was emulsified by a homogenizer manufactured by Nippon Seiki Seisakusho Co., Ltd., to give a capsule wall material-containing primary emulsifion (IIIa).

(4) Preparation of a Microcapsule Liquid Including Microcapsules Containing a Diazonium Salt 13.2 pars of the diazonium salt compound (F) shown below was dissolved in, and uniformly mixed with, 21 parts of ethyl acetate to give a diazonium salt-containing oil phase solution (IVa).

The oil phase solution (IVa) was added to the primary emulsion (IIIa) and the mixture was emulsified by a homogenizer manufactured by Nippon Seiki Seisakusho Co., Ltd., to give a secondary emulsion (Va). 60 parts of water were added to the obtained secondary emulsion (Va), and the dispersion was made uniform then subjected to a capsulation reaction at 40° C. under stirring for 3 hours. Then, the resulting capsule-containing emulsion was stirred under reduced pressure to remove the ethyl acetate. Thereafter, 4.1 parts of ion-exchange resin "AMBERLITE IRA68" (manufactured by Organo Corporation) and 8.2 parts of "AMBERLITE IRC50" (manufactured by Organo Corporation) were added thereto and stirred for 1 hour. Thereafter, the ion-exchange resin was removed by filtration, and the concentration of the filtrate was adjusted such that the solids content in the microcapsule liquid became 20%. In this way, a desired microcapsule liquid was obtained which includes microcapsules containing the diazonium salt.

Diazonium salt compound F

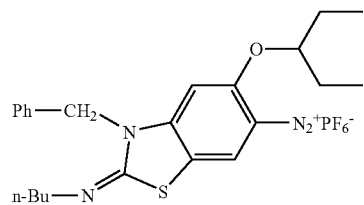

(Preparation of a Coupler Emulsion)

9.8 parts of the coupler compound (B) shown below, 9.9 parts of triphenyl guanidine (manufactured by Hodogaya Chemical Co., Ltd.), 19.8 parts of 4,4'-(m-phenylenediisopropylidene)diphenol (trade name: "BISPHENOL M", manufactured by Mitsui Petrochemical Industries, Ltd.), 1.3 parts of 3,3,3',3'-tetramethyl-5,5',6,6'-tetra(1-propyloxy)-1,1'-spirobisindane (manufactured by Sankyo Chemical Industries, Ltd.), 13.6 parts of 4-(2-ethylhexyloxy)benzene sulfonic acid amide (manufactured by Manac Incorporated), 6.8 parts of 4-n-pentyloxybenzene sulfonic acid amide (manufactured by Manac Incorporated) and 4.2 parts of calcium dodecylbenzenesulfonate (trade name: "PIONINE A-41-C" manufactured by Takemoto Oil & Fat Co., Ltd., 70% methanol solution) were dissolved in 37 parts of ethyl acetate to give a mixture (VI).

Coupler compound (B)

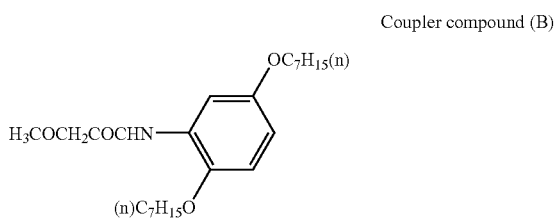

Separately, 107.3 parts of deionized water was added to, and uniformly mixed with, 206.3 parts of the aqueous alkali-treated gelatin solution to give a mixture (VII).

The mixture (VI) was added to the mixture (VII) and the mixture was emulsified by a homogenizer manufactured by Nippon Seiki Seisakusho Co., Ltd. The resulting coupler emulsion was heated under reduced pressure to remove the ethyl acetate, and the concentration of the dispersion was regulated such that the solids content became 26.5%. Further, 9 parts of SBR latex (trade name: "SN-307" manufactured by Sumika ABS Latex, 48% solution) whose concentration had been adjusted to 26.5% was added to, and uniformly mixed with 100 parts of the coupler emulsion. In this way, a coupler emulsion was obtained.

(Preparation of a Heat-sensitive Recording Layer Coating Liquid)

The microcapsule liquid and the coupler emulsion were mixed such that the ratio by mass of (the coupler compound/diazonium salt) was 2.2/1, to give a desired heat-sensitive recording layer coating liquid.

(Preparation of an Intermediate Layer Coating Liquid)

100 parts of alkali-treated low-ion gelatin (trade name: "#750 Gelatin", manufactured by Nitta Gelatin Inc.), 2.86 parts of 1,2-benzothiazolin-3-one (manufactured by Daito Chemical Industries, Ltd., 3.5% methanol solution), 0.5 part of calcium hydroxide and 521.643 parts of deionized water were mixed to form a uniform solution. In this way, an aqueous gelatin solution for the intermediate layer was obtained.

0.05 part of sodium 4-[(4-nonylphenoxy)trioxyethylene] butylsulfonate (manufactured by Sankyo Chemical Industries, Ltd., 2.0% aqueous solution), 1.5 parts of boric acid (4.0% aqueous solution), 0.19 part of 5% aqueous solution of polystyrene sulfonic acid (partially neutralized with potassium hydroxide), 3.42 parts of 4% aqueous solution of the compound (J) shown below, 1.13 parts of 4% aqueous solution of the compound (J') shown below, and 0.67 part of deionized water were uniformly mixed with 10 parts of the aqueous gelatin solution for the intermediate layer to give an intermediate layer coating liquid.

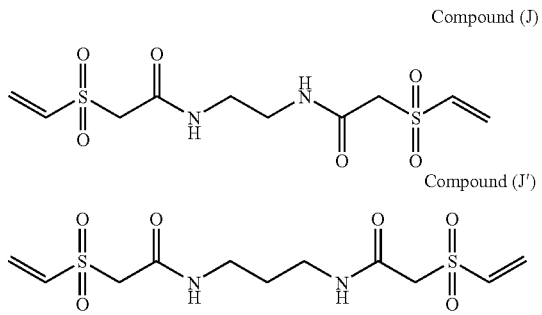

Compound (J)

Compound (J')

(Preparation of a Light Transmittance Controlling Layer Coating Liquid)

(1) Preparation of a Microcapsule Liquid Including Microcapsules Containing a UV Absorber Precursor 14.5 parts of a UV absorber precursor [2-allyl-6-(2H-benzotriazol-2-yl)-4-t-octylphenyl]benzene sulfonate, 5.0 parts of 2,5-di-(t-octyl)hydroquinone, 1.9 parts of tricresyl phosphate, 5.7 parts of α-methyl styrene dimer (trade name: "MSD-100" manufactured by Mitsui Chemicals, Inc.) and 0.45 part of calcium dodecylbenzenesulfonate (trade name: "PIONINE A-41-C" manufactured by Takemoto Oil & Fat Co., Ltd., 70% methanol solution) were added to, and uniformly dissolved in, 71 parts of ethyl acetate. The resulting mixture was mixed uniformly with 54.7 parts of a xylylene diisocyanate-trimethylol propane adduct (trade name: "TAKENATE D110N" manufactured by Takeda Mitsui Chemical, 75% ethyl acetate solution) as a capsule wall material to give an UV absorber precursor mixture (VIII).

Separately, 8.9 parts of 30% aqueous solution of phosphoric acid and 532.6 parts of deionized water were added to, and uniformly mixed with, 52 parts of itaconic acid-modified polyvinyl alcohol (trade name: "KL-318", manufactured by Kuraray Co., Ltd.) to give an aqueous solution (IX) of PVA.

117 parts of the mixture (VIII) was added to 518 parts of the aqueous solution (IX) and the mixture was emulsified by a homogenizer produced by Nippon Seiki Seisakusho. 254.1 parts of deionized water was added to, and uniformly mixed with, the resulting emulsion. Thereafter, 94.3 parts of ion-exchange resin "AMBERLITE MB-3" (manufactured by Organo Corporation) was added thereto and the mixture was stirred. Thereafter, the ion-exchange resin was removed by filtration, and the concentration of the filtrate was regulated such that the solids content of the capsule liquid became 13.5%. 2.416 parts of carboxy-modified styrene-butadiene latex (trade name: "SN-307" manufactured by Sumitomo Naugatuck Co., Ltd., 48% solution) and 39.5 parts of deionized water were added to, and uniformly mixed with, 859.1 parts of the capsule liquid to give a microcapsule liquid including microcapsules containing the UV absorber precursor.

(2) Preparation of a Light Transmittance Controlling Layer Coating Liquid 5.2 parts of a fluorine-based surfactant (trade name: "Megafack F-120" manufactured by Dainippon Ink and Chemicals, Incorporated, 5% aqueous solution), 7.75 parts of 4% aqueous solution of sodium hydroxide and 73.39 parts of sodium (4-nonylphenoxytrioxyethylene)butylsulfonate (manufactured by Sankyo Chemical Industries, Ltd., 2.0% aqueous solution) were added to, and uniformly mixed with, 1000 parts of the above microcapsule liquid to give a desired light transmission regulation layer coating liquid.

(Preparation of a Protective Layer Coating Liquid)

(1) Preparation of a PVA Solution for a Protective Layer 160 parts of a vinyl alcohol-alkyl vinyl ether copolymer (trade name: "EP-130", manufactured by Denki Kagaku Kogyo Kabushiki Kaisha), 8.74 parts of a mixture of sodium alkyl sulfonate and polyoxyethylene alkyl ether phosphate (trade name: "NEOSCORE CM-57" manufactured by Toho Chemical Industry Co., Ltd., 54% aqueous solution) and 3832 parts of deionized water were mixed and uniformly stirred to give a polyvinyl alcohol solution for protective layer.

(2) Preparation of a Protective Layer Pigment Dispersion Liquid 0.2 part of anionic special polycarboxylic acid-based polymer activator (trade name: "POISE 532A" manufactured by Kao Corporation, 40% aqueous solution) and 11.8 parts of deionized water were mixed with 8 parts of barium sulfate (trade name: "BF-21F" manufactured by Sakai Chemical Industry Co., Ltd., having a content of barium sulfate of 93% or higher), and the mixture was dispersed by DYNO-MILL to give a barium sulfate dispersion liquid.

8.1 parts of colloidal silica (trade name: "SNOWTEX O" manufactured by Nissan Chemical Industries, Ltd., 20% aqueous dispersion liquid) was added to 45.6 parts of the resulting barium sulfate dispersion liquid, to give a pigment dispersion liquid for a protective layer.

(3) Preparation of a Matting Agent Dispersion Liquid for a Protective Layer 3.8 parts of an aqueous dispersion liquid of 1,2-benzoisothiazolin-3-one (trade name: "PROXEL B. D", manufactured by ICI Americas Inc.) and 1976 parts of deionized water were mixed uniformly with 220 parts of wheat starch (trade name: "Komugi Denpun S" manufactured by Shinshin Shokuhin Kogyo Co., Ltd.), to give a matting agent dispersion for a protective layer.

(4) Preparation of a Protective Layer Coating Blend Liquid 40 parts of a fluorine-based surfactant (trade name: "MEGAFACK F-120" manufactured by Dainippon Ink and Chemicals, Incorporated, 5% aqueous solution), 50 parts of sodium (4-nonylphenoxytrioxyethylene)butylsulfonate (manufactured by Sankyo Chemical Industries, Ltd., 2.0% aqueous solution), 49.87 parts of the pigment dispersion liquid for a protective layer, 16.65 parts of the matting agent dispersion liquid for a protective layer, and 48.7 parts of a zinc stearate dispersion liquid (trade name: "Highdoline F115", manufactured by Chukyo Oil & Fat Co., Ltd., 20.5% aqueous solution) were uniformly mixed with 1000 parts of the PVA solution for a protective layer, to give a protective layer coating blend liquid.

(Preparation of a Support having an Undercoat Layer)

(1) Preparation of an Undercoat Layer Coating Liquid 40 parts of enzymatically decomposed gelatin (average molecular weight 10000, viscosity by PAGI method=1.5 mPa·s (15 mP), jelly strength by PAGI method=20 g) was added to, and dissolved in, 60 parts of deionized water at 40° C. under stirring to give an aqueous gelatin solution for an undercoat layer coating liquid.

Separately, 8 parts of water-swelling synthetic mica (trade name: "SOMASHIF ME100" with an aspect ratio of 1000, manufactured by Co-op Chemical Co., Ltd.) was mixed with 92 parts of water and then wet-dispersed by a visco-mill to give a mica dispersion liquid having an average particle diameter of 2.0 μm. Water was added to, and uniformly mixed with, the mica dispersion liquid to give a desired mica dispersion liquid having a mica concentration of 5%.

The temperature of the aqueous gelatin solution for an undercoat layer coating liquid was adjusted to 40° C. and the concentration thereof was adjusted to 40%. 120 parts of water and 556 parts of methanol were added to 100 parts of the aqueous gelatin solution. The mixture was sufficiently stirred, and then 208 parts of the mica dispersion liquid having a mica concentration of 5% was added thereto, and stirred sufficiently. Then, 9.8 parts of a 1.66% aqueous solution of polyethylene oxide-based surfactant was added thereto. Then, the liquid temperature was kept at 35 to 40° C., and 7.3 parts of a gelatin hardening agent (DENACOAL EX80 manufactured by Nagase Chemicals Ltd.) consisting of an epoxy compound was added thereto to give an undercoat layer coating liquid (solid concentration, 5.7%).

(2) Preparation of a Support having an Undercoat Layer

Wood pulp composed of 50 parts of LBPS and 50 parts of LBPK was beaten with a double disk refiner to a Canadian freeness of 300 ml, and 0.5 part of epoxylated behenic amide, 1.0 part of anion polyacrylamide, 1.0 part of aluminum sulfate, 0.1 part of polyamide polyamine epichlorohydrin and 0.5 part of cation polyacrylamide were added to the pulp to prepare a base paper having a weight of 114 g/m² with a wire paper machine, and then calendered such that the thickness was 100 μm. The amounts of the above components are expressed in terms of the ratios of their absolute dry masses to the mass of the pulp.

Subsequently, both sides of the resulting base paper were subjected to corona discharge treatments, and then one of the sides was coated with polyethylene resin having a thickness of 36 μm by a melt extrusion machine, to form a resin layer having a matted surface (hereinafter, this side is occasionally referred to as "rear side"). Then, the surface on the opposite side to the resin layer was coated, by a melt extrusion machine, with polyethylene including 10% of anatase type titanium dioxide and a slight amount of ultramarine to a thickness of 50 μm to form a highly glossy resin layer (hereinafter, this side is occasionally referred to as "front side"). The surface of the resin layer on the rear side was subjected to a corona discharge treatment. 1 part of aluminum oxide (trade name: "ALUMINA SOL 100", manufactured by Nissan Chemical Industries, Ltd.) and 2 parts of silicon dioxide (trade name: "SNOWTEX O", manufactured by Nissan Chemical Industries, Ltd.) as antistatic agents were dispersed in water. The obtained dispersion was coated on the surface of the resin layer on the rear side in an amount of 0.2 g/m² in terms of the dry mass. Subsequently, the surface of the polyethylene resin layer on the front side was subjected to a corona discharge treatment, and then coated with the undercoat layer coating liquid such that the coating amount of the mica was 0.26 g/m². The coating liquid was dried, thus a support having an undercoat layer was obtained.

(Preparation of a Heat-sensitive Recording Material)

The surface of the undercoat layer was simultaneously coated with four coating liquids for four layers. The four coating liquids are, in the order from the undercoat layer, the intermediate layer coating liquid, the heat-sensitive recording layer coating liquid, the light transmittance controlling layer coating liquid and the protective layer coating liquid. Then, the layers are sufficiently dried to give a heat-sensitive recording material (T1) of the invention.

In the above procedure, the heat-sensitive recording layer coating liquid was applied such that the amount of the solid of the diazonium salt (F) contained in the solution was 0.10 g/m². The intermediate layer coating liquid, the light transmittance controlling layer coating liquid and the protective layer coating liquid were applied such that the coating amount of the solid were respectively 2.39 g/m², 2.35 g/m² and 1.39 g/m².

Example 5

The heat-sensitive recording material (T2) of the invention was obtained in the same manner as in Example 4 except that the following diazonium salt (F-2) was added in place of the diazonium salt (F) in the preparation of the microcapsule liquid including microcapsules containing a diazonium salt.

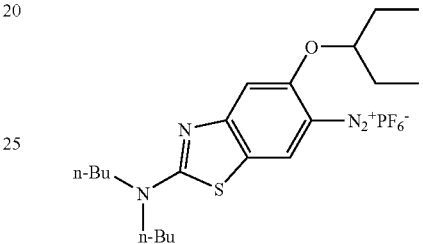

Diazonium salt (F-2)

Example 6

A heat-sensitive recording material (T3) of the invention was prepared in the same manner as in Example 4, except for the following changes.

(1) Preparation of a Diazonium Salt-containing Solution 13.2 parts of the diazonium salt (F), 14.7 parts of monoisopropyl biphenyl and 14.7 parts of diphenyl phthalate were added to, and uniformly dissolved in, 52 parts of ethyl acetate to give a diazonium salt-containing oil phase solution (Ib).

(2) Preparation of an Aqueous Phase Solution

Separately, 32 parts of deionized water and 0.67 part of SCRAPH AG-8 (manufactured by Nippon Fine Chemical Co., Ltd., 50% aqueous solution) were added to, and uniformly mixed with, 115.1 parts of the aqueous phthalated gelatin solution to give an aqueous phase mixture (IIb).

(3) Preparation of a Diazonium Salt-containing Emulsion

The oil phase mixture (Ib) was added to the aqueous phase mixture (IIb) and the resultant mixture was emulsified by a homogenizer manufactured by Nippon Seiki Seisakusho to give a diazonium salt-containing primary emulsion (IIIb).

(4) Preparation of a Capsule Wall Material-containing Solution

As the capsule wall material, 17.8 parts of a xylylene diisocyanate-trimethylol propane additive (trade name: "TAKENATE D110N" manufactured by Mitsui Takeda Chemical, 75% ethyl acetate solution) was added to, and uniformly mixed with, 36 parts of ethyl acetate to give a capsule wall material-containing mixture (IVb).

(5) Preparation of a Capsule Wall Material-containing Emulsion

Separately, 17.8 parts of deionized water and 0.37 part of SCRAPH AG-8 (manufactured by Nippon Fine Chemical Co., Ltd., 50% aqueous solution) were added to, and mixed uniformly with, 64 parts of the aqueous phthalated gelatin solution to give an aqueous phase mixture (Vb).

The capsule wall material-containing mixture (IVb) was added to the aqueous phase mixture (Vb) and the mixture was emulsified by a homogenizer manufactured by Nippon Seiki Seisakusho Co., Ltd., to give a capsule wall material-containing primary emulsion (VIb).

(6) Preparation of a Microcapsule Liquid Including Microcapsules Containing the Diazonium Salt The primary emulsion (IIIb) and the primary emulsion (VIb) were mixed with each other, and further emulsified by a homogenizer manufactured by Nippon Seiki Seisakusho Co., Ltd. to give a secondary emulsion (VIIb). 60 parts of water were added to the resulting secondary emulsion (VIIb) and the mixture was made uniform and subjected to a capsulation reaction at 40° C. under stirring for 3 hours. Then, the resulting capsule-containing emulsion was stirred under reduced pressure to remove the ethyl acetate. Thereafter, 4.1 parts of ion-exchange resin "AMBERLITE IRA68" (manufactured by Organo Corporation) and 8.2 parts of "AMBERLITE IRC50" (manufactured by Organo Corporation) were added thereto and stirred for 1 hour. Then, the ion-exchange resin was removed by filtration, and the concentration of the filtrate was adjusted such that the solids content in the microcapsule liquid became 20%. A desired microcapsule liquid was obtained in this way which includes microcapsules containing the diazonium salt.

The heat-sensitive recording material (T3) of the invention was obtained in the same manner as in Example 4 except that the microcapsule liquid obtained above was used in the preparation of the heat-sensitive recording layer coating liquid.

Comparative Example 2

A comparative heat-sensitive recording material (R1) was prepared in the same manner as in Example 4, except that the microcapsule liquid prepared by the following procedure was used as the microcapsule liquid in the preparation of the heat-sensitive recording layer coating liquid.

(1) Preparation of a Liquid Including a Diazonium Salt and a Capsule Wall Material 5.0 parts of the diazonium salt (F), 4.5 parts of monoisopropyl biphenyl and 4.5 parts of diphenyl phthalate were added to, and uniformly dissolved in, 22 parts of ethyl acetate. As the capsule wall material, 8.9 parts of a xylylene diisocyanate-trimethylol propane additive (trade name: "TAKENATE D110N" manufactured by Mitsui Takeda Chemical, 75% ethyl acetate solution) was added to, and uniformly mixed with, the above mixture to give an oil phase mixture (Ic) including the diazonium salt and capsule wall material.

(2) Preparation of an Aqueous Phase Solution

Separately, 16.3 parts of deionized water and 0.7 part of SCRAPH AG-8 (manufactured by Nippon Fine Chemical Co., Ltd., 50% aqueous solution) were added to, and uniformly mixed with, 58.6 parts of the aqueous phthalated gelatin solution to give an aqueous phase mixture (IIc).

(3) Preparation of a Microcapsule Liquid Including Microcapsules Containing a Diazonium Salt The oil phase mixture (Ic) was added to the aqueous phase mixture (IIc) and emulsified by a homogenizer manufactured by Nippon Seiki Seisakusho. 20 parts of water were added to the resulting emulsion and the mixture was made uniform and subjected to a capsulation reaction at 40° C. under stirring for 3 hours. Then, the resulting capsule-containing emulsion was stirred under reduced pressure to remove the ethyl acetate. Thereafter, 3.2 parts of ion-exchange resin "AMBERLITE IRA68" (manufactured by Organo Corporation) and 8.2 parts of "AMBERLITE IRC50" (manufactured by Organo Corporation) were added thereto and stirred for 1 hour. Then, the ion-exchange resin was removed by filtration, and the concentration of the filtrate was adjusted such that the solids content in the microcapsule liquid became 20%. In this way, a desired microcapsule liquid was obtained which includes microcapsules containing the diazonium salt.

A comparative heat-sensitive recording material (R1) was obtained in the same manner as in Example 4 except that the microcapsule liquid obtained above was used in the preparation of a heat-sensitive recording layer coating liquid.

Comparative Example 3

A comparative heat-sensitive recording material (R2) was obtained in the same manner as in Comparative Example 2 except that the following diazonium salt (F-3) was added in place of the diazonium salt (F) in the preparation of a microcapsule liquid including microcapsules containing a diazonium salt.

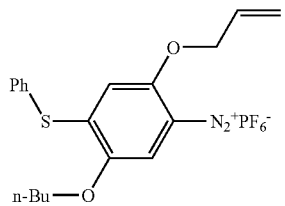

Diazonium salt (F-3)

(Evaluation Test)

The heat-sensitive recording materials (T1 to T3) of the invention and the heat-sensitive recording materials (R1 to R2) of the Comparative Examples were subjected to the following evaluation test. The evaluation results and measurement results are shown in Table 2 below.

(1) Thermal Recording (Image Formation)

Each heat-sensitive recording material was subjected to thermal printing with a thermal head "KST" (manufactured by Kyocera Corporation) to form an image yellow wherein the applied voltage and pulse width were selected such that the recording energy per unit area was 23 mJ/mm$^2$. After the printing, each heat-sensitive recording layer was irradiated for 15 seconds with UV rays from a UV lamp having an emission central wavelength of 365 nm and a power output of 40 W.

(2) Measurement of Optical Density of Developed Color

The maximum optical density of the developed color in the image region and the optical density of the non-printed region in each heat-sensitive recording material were measured with X-rite 310TR (manufactured by Nippon Lithograph, Inc.).

(3) Test of Raw Storage Stability

Prior to an image recording, each heat-sensitive recording material was stored over 72 hours under the conditions of 60° C. and 30% RH. Thereafter, a thermal recording was conducted and the optical densities were measured in the same manner as in the above items (1) and (2). The ratio of the maximum optical density of each heat-sensitive recording material to the maximum optical density of the heat-sensitive recording material which had not been subjected to the storage test was calculated. In other words, the maximum optical density of the heat-sensitive recording material of the item (3) was compared with the maximum optical density of the heat-sensitive recording material of the item (2).

(4) Test of Background Whiteness

Prior to the image recording, each heat-sensitive recording material was stored over 24 hours under the conditions of 23° C. and 50% RH. The heat-sensitive recording material was then irradiated for 20 seconds with UV rays from a UV lamp having an emission central wavelength of 365 nm and a power output of 40 W. Then, the heat-sensitive recording material was stored over 24 hours under the conditions of 23° C. and 50% RH. Then, the optical density in the irradiated region was measured in the same manner as in the above item (2).

TABLE 2

|  | Diazonium Salt | Raw Storage Stability | Background Whiteness |
| --- | --- | --- | --- |
| Example 4 | A | 89% | 0.047 |
| Example 5 | A-2 | 92% | 0.042 |
| Example 6 | A | 89% | 0.061 |
| Comparative Example 2 | A | 85% | 0.188 |
| Comparative Example 3 | A-3 | 77% | 0.139 |

As shown in Table 2, the heat-sensitive recording materials (Examples 4 to 6) using the microcapsule liquids formed by the methods of the invention exhibited superior raw storage stability and background whiteness to the heat-sensitive recording materials of Comparative Examples 2 and 3.

The invention provides a novel method for producing microcapsules. According to the invention, the material used in the method is not limited by the compatibility of the microcapsule wall material and the core substance-containing oil phase solution or the solubility of the microcapsule wall material in the oil phase solution. Accordingly, the microcapsule wall material and the oil phase solvent can be selected from a significantly broad range of materials, and the degree of freedom in material design and production method is increased. That is, the capsule performance can be designed freely and widely. Problems such as heat generation and reaction of the capsule wall material with the oil phase solution during emulsification can be suppressed, and the wall material remaining in the capsules is reduced. Therefore, the encapsulating performance can be maximized.

By the method for producing microcapsules according to the invention, there can be provided microcapsules having improved capsule performance (raw storage stability, heat sensitivity, optical density of the developed color, background fogging, environmental dependence and the like). It is further possible to provide high-performance heat-sensitive recording materials using the microcapsules.

The invention provides a new method for producing microcapsules. According to the method, it is possible to provide microcapsules containing a heterocyclic diazonium salt with an improved ability to donate an electron to a diazonio group and improved heat stability. The microcapsules suppress leakage and have an improved encapsulating performance. It is also possible to provide recording materials, particularly heat-sensitive recording materials. Those materials have excellent heat stability, superior raw storage stability and surface fogging. The quality of image on those materials does not deteriorate even when left for a long time in a severe light condition, a temperature condition, a humidity condition, or the like, after printing. The image on those materials have excellent light fastness.

What is claimed is:

1. A method for producing a microcapsule containing a core substance, the method comprising:
   adding an oil phase solution including the core substance to an aqueous phase medium to form a first mixture;
   forming a first emulsion including a primary dispersed particle by emulsifying the first mixture;
   adding a wall material solution including a capsule wall material to the first emulsion so as to form a second mixture;
   forming a secondary dispersed particle by emulsifying the second mixture; and
   forming a capsule wall at an interface of the secondary dispersed particle.

2. A method for producing a microcapsule containing a core substance, the method comprising:
   adding a wall material solution including a capsule wall material to an aqueous phase medium to form a first mixture;
   forming a first emulsion including a primary dispersed particle by emulsifying the first mixture;
   adding an oil phase solution including the core substance to the first emulsion so as to form a second mixture;
   forming a secondary dispersed particle by emulsifying the second mixture; and
   forming a capsule wall at an interface of the secondary dispersed particle.

3. The method for producing a microcapsule containing a core substance according to claim 2, wherein the core substance includes a diazonium salt represented by the following formula (I) or (II):

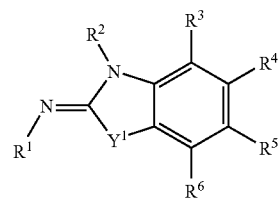

Formula (I)

wherein in the formula (I): $R^1$ and $R^2$ each independently represent an alkyl group, an alkoxy group, an alkylthio group, an arylthio group or an alkylamino group; $R^3$ to $R^6$ each independently represent a hydrogen atom, a halogen atom, an alkyl group, an alkoxy group, an aryl group, an aryloxy group, an alkylthio group, an arylthio group, an alkylamino group or a —$N_2^+X^-$ group; at least one of $R^3$ to $R^6$ represents a —$N_2^+X^-$ group; $X^-$ represents a monovalent counter anion; and $Y^1$ represents a sulfur atom, an oxygen atom, or a nitrogen atom bound to an alkyl group,

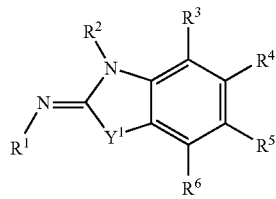

Formula (I)

wherein in the formula (I): $R^1$ and $R^2$ each independently represent an alkyl group, an alkoxy group, an alkylthio group, an aryl group, an arylthio group or an alkylamino group; $R^3$ to $R^6$ each independently represent a hydrogen atom, a halogen atom, an alkyl group, an alkoxy group, an aryl group, an aryloxy group, an alkylthio group, an arylthio group, an alkylamino group or a —$N_2{}^+X^-$ group; at least one of $R^3$ to $R^6$ represents a —$N_2{}^+X^-$ group; $X^-$ represents a monovalent counter anion; and $Y^1$ represents a sulfur atom, an oxygen atom, or a nitrogen atom bound to an alkyl group,

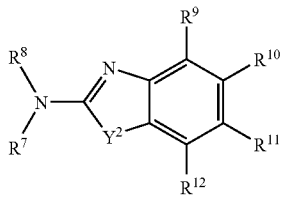

Formula (II)

wherein in the formula (II): $R^7$ and $R^8$ each independently represent a hydrogen atom, an alkyl group, an alkoxy group, an aryl group, an alkylthio group, an arylthio group or an alkylamino group; $R^7$ and $R^8$ may be bound to each other to form a nitrogen-containing ring; $R^9$ to $R^{12}$ each independently represent a hydrogen atom, a halogen atom, an alkyl group, an alkoxy group, an aryl group, an aryloxy group, an alkylthio group, an alkylamino group or a —$N_2{}^+X^-$ group; at least one of $R^9$ to $R^{12}$ represents a —$N_2{}^+X^-$ group; $X^-$ represents a monovalent counter anion; and $Y^2$ represents a sulfur atom, an oxygen atom, or a nitrogen atom bound to an alkyl group.

4. A method for producing a microcapsule containing a core substance, the method comprising:

adding an oil phase solution including the core substance to a first aqueous phase medium to form a first mixture;

forming a first emulsion including a first primary dispersed particle of the core substance by emulsifying the first mixture;

adding a wall material solution including a capsule wall material to a second aqueous phase medium to form a second mixture;

forming a second emulsion including a second primary dispersed particle of the capsule wall material by emulsifying the second mixture;

mixing the first emulsion and the second emulsion to form a third mixture;

forming a secondary dispersed particle by emulsifying the third mixture; and forming a capsule wall at an interface of the secondary dispersed particle, wherein the core substance includes a diazonium salt represented by the following formula (I) or (II):

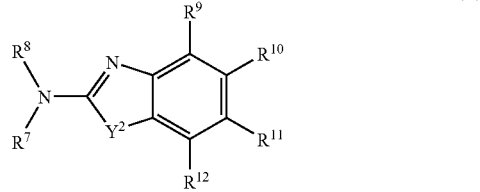

Formula (II)

wherein in the formula (II): $R^7$ and $R^8$ each independently represent a hydrogen atom, an alkyl group, an alkoxy group, an aryl group, an alkylthio group, an arylthio group or an alkylamino group; $R^7$ and $R^8$ may be bound to each other to form a nitrogen-containing ring; $R^9$ to $R^{12}$ each independently represent a hydrogen atom, a halogen atom, an alkyl group, an alkoxy group, an aryl group, an aryloxy group, an alkylthio group, an alkylamino group or a —$N_2{}^+X^-$ group; at least one of $R^9$ to $R^{12}$ represents a —$N_2{}^+X^-$ group; $X^-$ represents a monovalent counter anion; and $Y^2$ represents a sulfur atom, an oxygen atom, or a nitrogen atom bound to an alkyl group.

* * * * *